(12) United States Patent
Kawazu et al.

(10) Patent No.: US 9,341,124 B2
(45) Date of Patent: May 17, 2016

(54) ENGINE CONTROL SYSTEM DESIGNED TO PREDICT ENGINE SPEED ACCURATELY

(71) Applicant: DENSO CORPORATION, Kariya, Aichi-pref. (JP)

(72) Inventors: Shinsuke Kawazu, Toyokawa (JP); Yoshinori Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 311 days.

(21) Appl. No.: 14/048,638

(22) Filed: Oct. 8, 2013

(65) Prior Publication Data
US 2014/0107903 A1    Apr. 17, 2014

(30) Foreign Application Priority Data
Oct. 11, 2012    (JP) .................................. 2012-225831

(51) Int. Cl.
*F02D 31/00*    (2006.01)
*F02D 41/00*    (2006.01)
(Continued)

(52) U.S. Cl.
CPC .......... *F02D 31/001* (2013.01); *F02D 41/0097* (2013.01); *F02D 41/065* (2013.01);
(Continued)

(58) Field of Classification Search
CPC ..... F02D 31/00; F02D 31/001; F02D 41/042; F02D 41/06; F02D 41/065; F02D 2200/101; F02D 2250/06; F02N 11/08; F02N 11/0844; F02N 11/0855; F02N 2200/022; F02N 2250/04; Y02T 10/48

USPC ................. 701/101, 102, 105, 110, 112–114; 123/179.4, 198 DB, 198 F, 319, 339.19, 123/339.2, 339.25, 480, 481, 493
See application file for complete search history.

(56) References Cited

U.S. PATENT DOCUMENTS

| | | | |
|---|---|---|---|
| 2006/0081207 A1* | 4/2006 | Nakamura .......... | F01L 13/0026 123/179.3 |
| 2011/0056450 A1* | 3/2011 | Notani ................ | F02N 11/0855 123/179.4 |

(Continued)

FOREIGN PATENT DOCUMENTS

| JP | A-2011-140938 | 7/2011 |
|---|---|---|
| JP | A-2012-31819 | 2/2012 |

*Primary Examiner* — John Kwon
*Assistant Examiner* — Johnny H Hoang
(74) *Attorney, Agent, or Firm* — Oliff PLC

(57) ABSTRACT

An engine speed predicting system for a vehicle includes a first calculator, a second calculator, and a switch which may be realized by software. The first calculator calculates a predicted speed of an engine of the vehicle during forward rotation of the engine when speed of the engine is decreasing after fuel stops being burned in the engine. The second calculator calculates a predicted speed of the engine during reverse rotation of the output shaft of the engine. The switch serves to select one of the first calculator and the second calculator which is to be used in calculating the predicted speed of the engine depending upon whether the predicted speed lies during the forward rotation or during the reverse rotation of the output shaft of the engine. This ensures the accuracy in predicting the speed of the engine regardless of the direction of rotation of the engine.

8 Claims, 10 Drawing Sheets

(51) Int. Cl.
  *F02D 41/06* (2006.01)
  *F02N 11/08* (2006.01)
  *F02D 41/04* (2006.01)
  *F02N 11/10* (2006.01)

(52) U.S. Cl.
  CPC ........ *F02N 11/0844* (2013.01); *F02N 11/0855* (2013.01); *F02D 41/042* (2013.01); *F02D 2041/0095* (2013.01); *F02D 2200/101* (2013.01); *F02D 2250/06* (2013.01); *F02N 11/101* (2013.01); *F02N 2200/022* (2013.01); *F02N 2250/04* (2013.01); *F02N 2300/2006* (2013.01); *Y02T 10/48* (2013.01)

(56) References Cited

U.S. PATENT DOCUMENTS

| | | |
|---|---|---|
| 2011/0137544 A1 | 6/2011 | Kawazu et al. |
| 2011/0288752 A1* | 11/2011 | Muller .................. F02D 41/042 701/112 |
| 2011/0290010 A1* | 12/2011 | Fulks .................... F02D 41/009 73/114.26 |
| 2012/0029797 A1 | 2/2012 | Notani |
| 2012/0303251 A1* | 11/2012 | Shimizu .............. F02D 13/0238 701/113 |

* cited by examiner

ENGINE CONTROL SYSTEM DESIGNED TO PREDICT ENGINE SPEED ACCURATELY

CROSS REFERENCE TO RELATED DOCUMENT

The present application claims the benefit of priority of Japanese Patent Application No. 2012-225831 filed on Oct. 11, 2012, the disclosure of which is incorporated herein by reference.

BACKGROUND OF THE INVENTION

1. Technical Field

This disclosure relates generally to an engine control system for automotive vehicles, and more particularly to such a control system designed as an engine speed predicting system to predict the speed of an engine while it is dropping after fuel stops being burned in the engine.

2. Background Art

Engine control systems for automotive vehicles are known which are equipped with an idle-stop feature (also called an automatic engine stop/restart system) designed to detect driver's action, such as accelerating or braking, and start or stop an engine of the vehicle automatically in order to reduce the consumption of fuel in the engine.

There has also been proposed a technique to restart the engine as quickly as possible without waiting for an output shaft of the engine to stop rotating in response to an engine restart request while the speed of the engine is decreasing. For instance, Japanese Patent First Publication No. 2011-140938 teaches such an engine restart system. This system also works to calculate the speed of the engine while it is dropping to mathematically project a future speed of the engine after a lapse of time required to bring a pinion of a starter into engagement with a ring gear coupled to an output shaft of the engine and to control an operation of the starter as a function of the projected speed of the engine. The publication also teaches taking into consideration the fact that the speed of the engine usually pulsates in a period of time where the speed of the engine drops following an automatic stop of the engine to calculate the speed of the engine based on a loss of energy in the engine occurring in a previous calculation cycle.

Usually, once the speed of the engine decreases to approximately zero after automatic stop of the engine, it causes the piston of the engine to fail to pass the top dead center, so that the rotation of the engine will be reversed. Subsequently, the engine continues to rotate alternately in forward and reverse directions and then finally stops. It is usually difficult to predict the time when an engine restart request should be made while the speed of the engine is dropping. For instance, the engine restart request is sometimes issued while the output shaft of the engine is rotating in the reverse direction. It is advisable that the engine be restarted as quickly as possible in response to the engine restart request to minimize a lag in starting the engine.

There is a possibility that bringing the pinion into contact with the ring gear to achieve engagement therebetween while the output shaft of the engine is rotating in the reverse direction will result in increased mechanical noise or wear of the pinion or the ring gear. It is, therefore, necessary to achieve the engagement between the pinion and the ring gear in a range where the speed of the engine will not result in serious noise or wear. The achievement of engagement between the pinion and the ring gear in such a range requires accurate prediction of the speed of the engine. The engine restart system, as taught in the above publication, is capable of determining the speed of the engine accurately until it drops to zero for the first time after the burning of fuel in the engine is stopped, in other words, while the engine is rotating in the forward direction, but however, may make a great error in calculating the speed of the engine while the output shaft of the engine is rotating in the reverse direction.

SUMMARY

It is therefore an object to provide an engine control system designed to accurately calculate or predict the speed of an engine while it is dropping after burning of fuel is stopped in the engine.

According to one aspect of the invention, there is provided an engine speed predicting system for a vehicle which may be employed in an automatic engine stop/restart system. The engine speed predicting system includes a first calculator, a second calculator, and a switch which may be realized by software. The first calculator works to calculate a predicted value of speed of an engine mounted in the vehicle during forward rotation of an output shaft of the engine within one of a sequence of speed prediction periods when speed of the engine is decreasing after fuel stops being burned in the engine. Each of the speed prediction periods is set within an interval between start of decreasing of the speed of the engine and a complete stop of the engine. The second calculator works to calculate a predicted value of the speed of the engine during reverse rotation of the output shaft of the engine within one of the speed prediction periods. The switch serves to switch between the first calculator and the second calculator to select one of them which is to be used in calculating the predicted value of the speed of the engine depending upon whether the predicted value lies during the forward rotation or during the reverse rotation of the output shaft of the engine.

It has been found that the prediction of the speed of the engine in the same way when the engine is rotating in the forward direction and when the engine is rotating in the reverse direction during decreasing of the speed of the engine may result in an increase in error of the predicted value of the speed of the engine. In light of this fact, the engine speed predicting system is equipped with two calculators: the first and second calculators working to predict the speed of the engine in different ways during the forward rotation and during the reverse rotation of the output shaft of the engine. This ensures the accuracy in predicting the speed of the engine while it is dropping after stop of burning of fuel in the engine, which enables, for example, the time when the engagement of a pinion with a ring gear coupled to the output shaft of the engine should be established for restarting the engine to be optimized.

In the preferred embodiment, the second calculator may be designed to calculate the predicted value of the speed of the engine based on the fact that a friction loss that is a component of a loss of energy in the engine arising from mechanical friction in the engine, as created by stroke of a piston of the engine, acts on the output shaft of the engine in opposite directions at the same angular position of the output shaft between the forward rotation and the reverse rotation of the output shaft of the engine.

Usually, the speed of the engine increases and then decreases cyclically due to a periodic change in volume of a combustion chamber of the engine. If every cycle of increase and decrease in volume of the combustion chamber is defined as an engine rotation pulsating period, the engine torque (i.e., a loss energy) will change in a similar pattern in two successive ones of the engine rotation pulsating periods during the forward rotation of the engine, so that loci of the speed of the engine in the two successive ones have a similar pulsating shape. Such a condition is, however, not satisfied immediately after the rotation of the engine is changed from the forward direction to the reverse direction. This is because a compression component of the loss energy (i.e., a loss of torque of the output shaft of the engine) which arises from a stroke of the piston (i.e., compression and expansion of the combustion chamber of the engine) acts on the output shaft in the same direction in the same angular range of the output shaft before and after the reversal of rotation of the output shaft regardless of the direction of rotation of the output shaft, while a friction component of the loss energy which arises from mechanical friction, as created by the stroke of the piston, acts on the output shaft in opposite directions in the same angular range of the output shaft before and after the reversal of rotation of the output shaft. The use of the loss energy appearing during the forward rotation of the output shaft of the engine in predicting the speed of the engine after the rotation of the output shaft is changed to the reverse direction, therefore, results in an increased error of the predicted value of the speed of the engine. Therefore, the engine speed predicting system is designed to calculate the predicted value of the speed of the engine during the reverse rotation of the output shaft based on the fact that the direction in which the friction component of the loss energy acts on the output shaft is different between during the forward rotation of the output shaft and during the reverse rotation of the output shaft.

The first calculator may define each cycle of a change in speed of the engine arising from a periodic change in volume of a combustion chamber of the engine as one of the engine rotation pulsating periods each of which is one of the speed prediction periods and predict a value of the speed of the engine in a first period that of one of the engine rotation pulsating periods based on a loss energy that is a loss of energy in the engine, as created in a second period that is one of the engine rotation pulsating periods which precedes the first period. The second calculator reverses a sign of a friction component included in a loss energy that is a loss of energy in the engine in one of the engine rotation pulsating periods during the forward rotation of the output shaft of the engine. The friction component results from mechanical friction in the engine, as created by stroke of a piston of the engine, and is contained in the loss energy along with a compression component resulting from a change in volume of the combustion chamber of the engine. The second calculator then determines the predicted value of the speed of the engine in a following one of the engine rotation pulsating periods during the reverse rotation of the output shaft of the engine based on the sum of the friction component whose sign is reversed and the compression component whose sign remains unchanged.

The second calculator may set a first prediction point at which the predicted value of the speed of the engine is to be calculated immediately after the rotation of the output shaft of the engine is changed from the forward direction to the reverse direction to an angular position of the output shaft of the engine which is returned from a zero-arrival position that is an angular position of the output shaft when the speed of the output shaft has reached zero by an angle through which the output shaft has rotated from a prediction point at which the speed of the output shaft has been predicted last before reversal of the rotation of the output shaft to the zero-arrival position.

The second calculator may determine one of the angular position of the output shaft of the engine at a given time set before start of the reverser rotation of the output shaft and a parameter correlating with the angular position of the output shaft at the given time based on the predicted value of the speed of the output shaft during the forward rotation of the output shaft, as calculated by the first calculator. The second calculator calculates the predicted value of the speed of the output shaft during the reverse rotation of the output shaft based on the one of the angular position and the parameter.

The engine speed predicting system may also include a controller which serves as an automatic engine stop/restart system to stop the engine when a given automatic engine stop condition is met and restart the engine through a starter when a given automatic engine restart condition is encountered after stop of the engine. The starter includes an electric motor which rotates a pinion and an actuator which moves the pinion into engagement with a ring gear coupled to the output shaft of the engine. The controller determines a time when the pinion of the starter is to start to travel based on the predicted value of the speed of the output shaft of the engine, as calculated by either of the first and second calculators.

The controller may set a pinion travel inhibition period in which the pinion is inhibited from traveling toward the ring gear based on the predicted value of the speed of the engine. When the given automatic engine restart condition is satisfied within the pinion travel inhibition period, the controller starts to move the pinion through the starter after expiry of the pinion travel inhibition period.

The controller may determine whether a reversal peak value in a first cycle of the reverse rotation of the output shaft while the speed of the engine is decreasing is greater than a given value or not. The reversal peak value is a peak of the speed of the output shaft of the engine within a period of time in which the output shaft has rotated by a reverse rotation amount after the rotation of the output shaft is changed in the reverse direction during decreasing of the speed of the engine. The reverse rotation amount is an amount by which the output shaft of the engine rotates in the reverse direction within an interval from start of reversal of rotation of the output shaft until the rotation of the output shaft is returned to the forward direction. The controller permits the pinion to engage the ring gear during the reverse rotation of the output shaft when the reversal peak value is determined to be smaller than or equal to the given value and inhibits the pinion from engaging the ring gear during the reverse rotation of the output shaft when the reversal peak value is determined to be greater than the given value.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
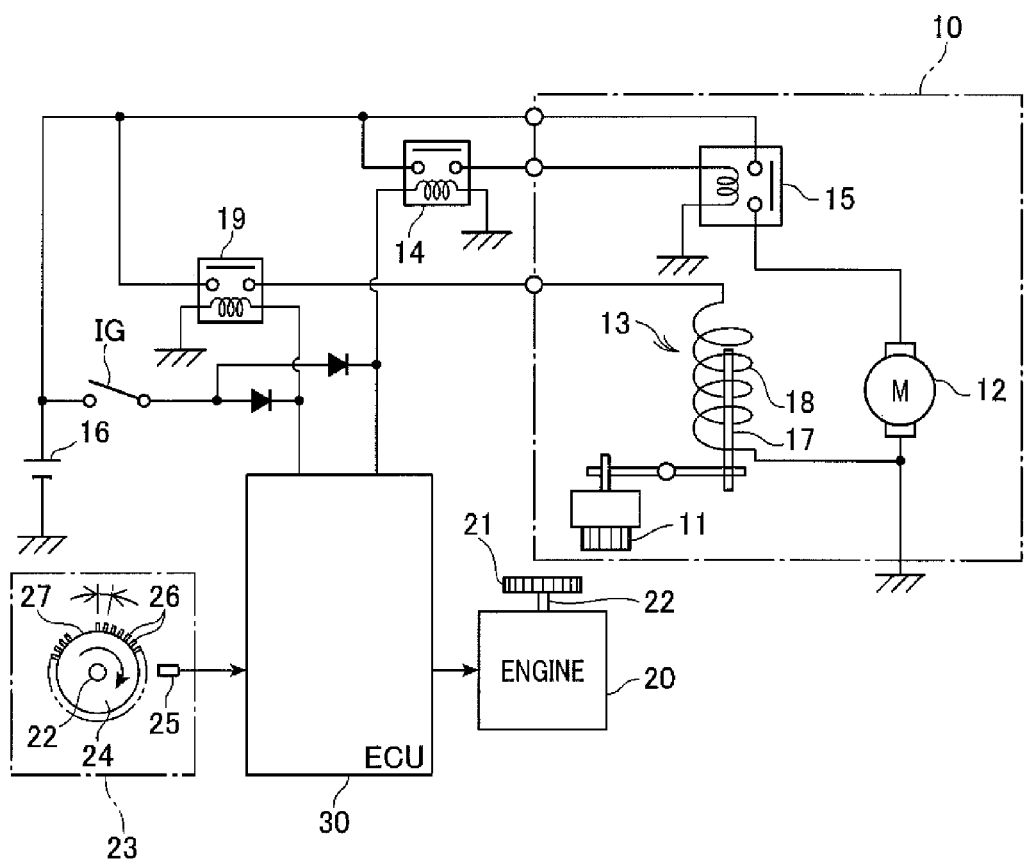
FIG. 1 is a block diagram which illustrates an engine control system according to an embodiment.

Referring to the drawings, wherein like reference numbers refer to like parts in several views, particularly to FIG. 1, there is shown an engine control system designed for a four-cycle four-cylinder internal combustion engine. The engine control system, as will be apparent from the following discussion, work as an engine speed predicting system and is equipped with an electronic control unit (ECU) 30 to control the quantity of fuel to be sprayed into the engine and the ignition timing and also to perform an idle stop control (i.e., automatic engine stop/restart control).

The starter 10, as illustrated in FIG. 1, is engineered as a pinion-push engine starting deice and equipped with an electric motor 12 and an electromagnetic actuator 13. The electric motor 12 works to rotate a pinion 11. The electromagnetic actuator 13 works as an electrically-driven actuator to thrust the pinion 11 in an axial direction thereof. The electric motor 12 is connected to a storage battery 16 through a power supply relay 15. When a switch of the power supply relay 15 is closed, electric power is enabled to be supplied from the battery 12 to the motor 12. The power supply relay 15 has a coil connected to a motor-driving relay 14 which is opened or closed in response to input of an electric signal. Specifically, the motor-driving relay 14 has a switch which is closed in response to input of a closing signal (i.e., an on-signal) to start supplying the power from the battery 16 to the motor 12.

The electromagnetic actuator 13 is equipped with a plunger 17 and a coil 18 which is energized to magnetically attract the plunger 17 in an axial direction thereof to move the pinion 11 through a lever. The electromagnetic actuator 13 is coupled to the battery 16 through a pinion-driving relay 19. The pinion-driving relay 19 is opened or closed in response to an electric signal which is separate from that inputted to the motor-driving relay 14, so that the rotation of the pinion 11, as achieved by the motor 12, may be controllable independently from the thrusting movement of the pinion 11, as achieved by the electromagnetic actuator 13.

The pinion 11 is located at a place where teeth of the pinion 11 is to be pushed by the plunger 17 into mesh with teeth of the ring gear 21 joined to an output shaft (i.e. the crankshaft 22) of the engine 20. Specifically, when the electromagnetic actuator 11 is in a deenergized state, the pinion 11 is placed away from the ring gear 21. When the pinion-driving relay 19 is energized or closed, it will cause the electric power to be supplied from the battery 16 to the electromagnetic actuator 13 to attract the plunger 17 in the axial direction thereof, thereby pushing the pinion 11 toward the ring gear 21. The teeth formed on an outer periphery of the pinion 11 are then meshed with those of the ring gear 21. In such a condition, the electric motor 12 is energized, so that the pinion 11 rotates the ring gear 21, thereby applying initial torque to the engine 20, that is, cranking the engine 20.

The engine control system also includes a crank angle sensor 23 which produces a rectangular signal at intervals of a given crank angle of the engine 20. Specifically, the crank angle sensor 23 is equipped with a pulsar (i.e., a rotary disc) 24 which rotates along with rotation of the crankshaft 22 and an electromagnetic pickup 25 which is disposed near an outer periphery of the pulsar 24. The pulsar 24 has formed on a circumference thereof a plurality of protrusions 26 which are arrayed at a regular interval of, for example, 30° CA away from each other and an even area 27 where there are no protrusions, e.g., the two protrusions 26 are omitted. When the pulsar 24 rotates following the rotation of the crankshaft 22, the electromagnetic pickup 25 outputs a pulse signal (which will also be referred to as a crank pulse signal below) each time one of the protrusions 26 reaches or passes the electromagnetic pickup 25, that is, at an interval of 30° CA in this embodiment. The ECU 30 analyzes the pulse signal, as inputted from the electromagnetic pickup 25, and determines the speed and angular velocity of the crankshaft 22 of the engine 20 as a function of a width of the pulse signal. The ECU 30 also counts the number of the pulse signals, as inputted sequentially, to determine the crank angle or angular position of the crankshaft 22.

The ECU 30 works as an electronic controller equipped with a typical microcomputer to monitor or analyze outputs from sensors installed in the engine control system for controlling the quantity of fuel to be sprayed into the engine 20, the ignition timing, the operation of the engine 20, for example, in an idle stop mode, and the operation of the starter 10.

The idle stop control operation to be executed by the engine control system of this embodiment will be described below. The idle stop control operation is to automatically stop the engine 20 when an automatic engine stop condition(s) is met during an idle mode of operation of the engine 20 and then restart the engine 20 when an automatic engine restart condition(s) is met. For instance, the automatic engine stop condition is any of conditions where the accelerator (e.g., the accelerator pedal) of the vehicle has been released fully, that is, the engine 20 is idling, where the brake pedal has been depressed, and where the speed of the vehicle 20 has dropped below a given value. The automatic engine restart condition is either of conditions where the accelerator has been depressed and where the brake pedal has been released fully.

The engine control system of this embodiment is so designed to restart the engine 20 as quickly as possible without waiting for the engine 20 to stop completely when the automatic engine restart condition is satisfied in a period of time when the speed of the engine 20 is dropping following an automatic stop of the engine 20.

Specifically, when the automatic engine stop condition is encountered, the engine control system works to stop burning the fuel in the engine 20. When the automatic engine restart condition is met during a period of time in which the speed of the engine 20 is dropping following the stop of burning of fuel in the engine 20, the engine control system outputs the on-signal to the pinion-driving relay 19 at a time set as a function of the speed of the engine 20 (e.g., when the speed of the engine 20 has fallen in a low-speed range of 100 rpm or less). This causes the coil 18 to be energized to thrust the pinion 11 toward the ring gear 21. After a given period of time (which will also be referred to as a travel time Tp below) has passed since the pinion 11 was thrust, the engine control system outputs the on-signal to the motor-driving relay 14. The travel time Tp is an amount of time required between when the pinion 11 starts to be moved and when the pinion 11 travels to and contact with the ring gear 21. The output of the on-signal to the motor-driving relay 14 after a lapse of the travel time Tp causes the pinion 11 which has engaged with the ring gear 21 to be rotated to crank the engine 20 without having to wait for the engine 20 to stop completely.

The engagement of the pinion 11 with the ring gear 21 is preferably achieved when a relative speed of the ring gear 21 to the pinion 11 is in a given range of, for example, 0±100 rpm in order to minimize mechanical noise arising from the engagement therebetween or wear of teeth thereof. Before the pinion-driving relay 19 is closed, the pinion 11 is located away from the ring gear 21. It, thus, takes time to move the pinion 11 and contact the pinion 11 with the ring gear 21. Therefore, if the pinion 11 starts to be moved at the moment of satisfaction of the automatic engine restart condition when the speed of the engine 20 is in a range where the pinion 11 and the ring gear 21 are permitted to be engaged, it may cause the speed of the engine 20 to lie out of such a permissible range at a time when the pinion 11 actually engages with the ring gear 21.

Moreover, the crank angle sensor 23 that is of an electromagnetic pickup type usually has a limited engine speed range in which a pulse signal (which will also be referred to as a crank pulse signal below) can be produced and can't measure the speed of the engine 20 accurately, especially in a low-speed range of, for example, 50 rpm or less. This is because it is impossible for the crank angle sensor 23 to sense passage of each of the protrusions 26, in other words, the crank angle sensor 23 hardly produce a change in magnetic field in the low-speed range. Use of an output from the crank angle sensor 23 in controlling the operation of the starter 10 may, therefore, result in a deterioration of the controllability of the engine control system.

In order to alleviate the above problems, the ECU 30 is engineered to estimate or calculate a future speed of the engine 20 while the speed of the engine 20 is dropping and determine the time when the pinion 11 is to start to be moved and the time when the motor 12 is to start to be actuated as a function of the calculated future speed of the engine 20. Specifically, the engine control system is equipped with a first calculator which serves as rotation calculating means to calculate the speed of the engine 20 when it is dropping, and the crankshaft 22 is rotating in the forward direction (i.e., the normal direction) and a second calculator which serves as rotation calculating means to calculate the speed of the engine 20 when it is dropping, and the crankshaft 22 is rotating in the reverse direction.

Usually, when the speed of the engine 20 has decreased to approximately zero after automatic stop of the engine 20, it causes the piston of the engine 20 to fail to pass the top dead center thereof, so that the rotation of the engine 20 will be changed from the forward direction to the reverse direction. The engine 20 then continues to rotate alternately in forward and reverse directions and then finally stops. The first calculator of the engine control system works to determine the speed of the engine 20 until it reaches zero for the first time after the engine 20 stops burning the fuel following automatic stop of the engine 20. When the sign of speed of the engine 20, as determined by the first calculator, has changed to negative, the engine control system switches from the first calculator to the second calculator to determine the speed of the engine 20. How to predict the speed of the engine 20 through the first and second calculators will be described below in detail.

The predication of the speed of the engine 20, as made by the first calculator, will first be discussed below. The first calculator defines each cycle of a change in speed of the engine 20 arising from a sequence of increasing and decreasing of the volume of a cylinder (i.e., a combustion chamber) of the engine 20 as an engine speed prediction period of time (which will also be referred to as an engine rotation pulsating period below) and calculates the speed of the engine 20 in one of the engine rotation pulsating periods as a function of a loss of energy in the engine 20 in a preceding one of the engine rotation pulsating periods to determine the speed of the engine 20 when the engine 20 is revolving in the forward direction. The engine 20 in this embodiment is, as described above, a four-cycle four-cylinder internal combustion engine. If the engine 20 is a single cylinder engine, the engine speed prediction period or the engine rotation pulsating period, as referred to herein, is a cycle in which the piston travels from, for example, the TDC to the BDC and then returns to the TDC, in other words, a cycle in which the volume of a combustion chamber of a cylinder of the engine 20 is increased and then decreased, or vice versa. The engine 20 of this embodiment has four cylinders. Therefore, when the combustion chamber in any one of the cylinders is compressed, that of another of the cylinders subsequently expands. Such a cycle (i.e., a 180° rotation of the crankshaft 22) is defined as one of the engine rotation pulsating periods in this embodiment.

The first calculator assumes that a loss of energy that is a loss of torque of the crankshaft 22 (which will also be referred to as loss energy below) while the engine 20 is rotating in the forward direction during decreasing of the speed thereof, remains constant at the same angular position of the piston of the engine 20. The first calculator defines, as described above, each cycle (i.e., 180° CA (Crank Angle) in this embodiment) of a change in instantaneous speed of the engine 20 arising from a cycle of a sequence of increasing and decreasing of the volumes of the combustion chambers of the engine 20 as one of the engine rotation pulsating periods and calculates future values of the speed of the engine 20 in sequence as a function of past values thereof in each of the engine rotating pulsating periods in each of the engine rotation pulsating periods. In other words, the first calculator determines a future speed of the engine 20 based on the fact that when the engine 20 is revolving in the forward direction, torque, as produced by the engine 20, will vary in the same pattern in successive two of the engine rotation pulsating periods. The above instantaneous speed of the engine 20 is the speed of the engine 20 derived as a function of an amount of time required for the crankshaft 22 to rotate through a given angle. The first calculator, therefore, serves to calculate a predicted value of the instantaneous speed of the engine 20 which would appear at an angle of rotation of the engine 20 (i.e., an angular position of the crankshaft 22) where the crank pulse signal will be next outputted from the crank angle sensor 23, that is, at a subsequent cycle of the calculation in the ECU 30 and then calculate a predicted value of the instantaneous speed of the engine two cycles of the calculation later based on the predicted value in the subsequent cycle of the calculation. In this way, the ECU 30 derives the locus of a change in speed of the engine 20 in a period of time in which the speed of the engine 20 is decreasing.

Figure 2:
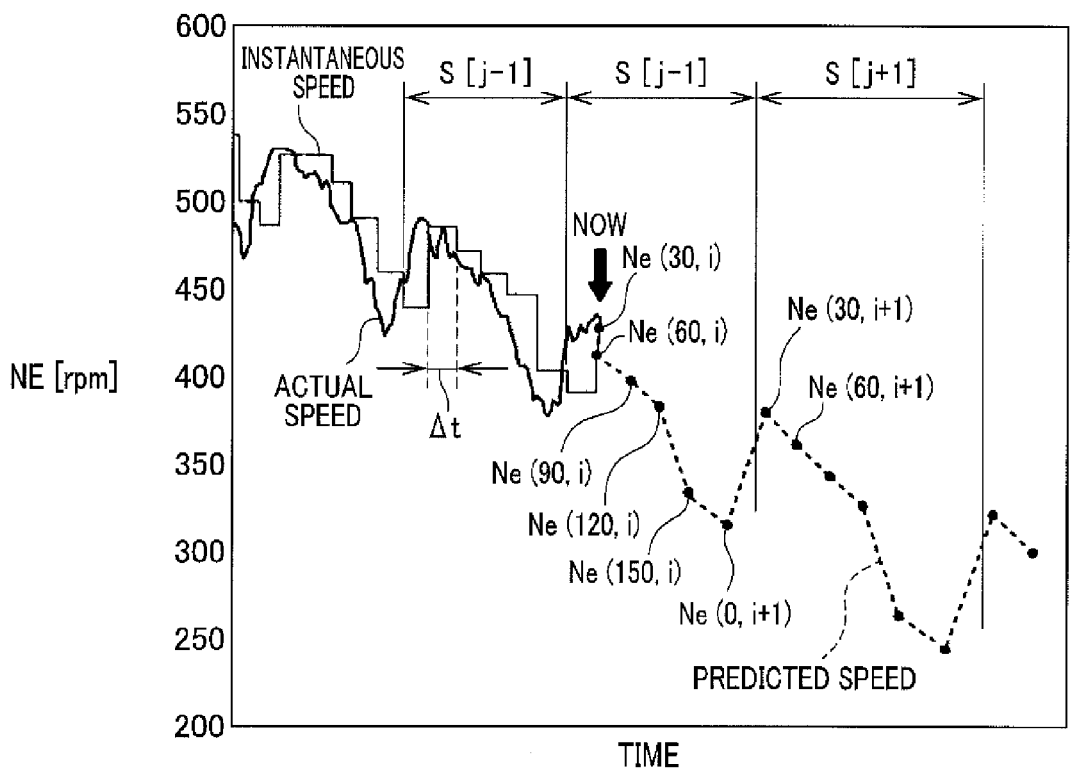
FIG. 2 is a graph which represents how to calculate a predicted value of speed of an engine through a first calculator.

FIG. 2 is a graph which represents how to calculate a predicted value of the speed of the engine 20 through the first calculator. Each of a sequence of the engine rotation pulsating periods is, as described above, equivalent to a 180° CA within an interval from when the piston in each cylinder of the engine 20 reaches the TDC to when it reaches the TDC in a subsequent cycle of stroke thereof. In FIG. 2, S[j] represents a current one of the engine rotation pulsating periods. S[j−1] represents a previous one of the engine rotation pulsating periods. S[j+1] represents a subsequent one of the engine rotation pulsating periods.

Each time the crank pulse signal is inputted from the crank angle sensor 23 in a period of time when the speed of the engine 20 is dropping after the automatic engine stop condition is encountered, that is, every 30° CA, the ECU 30 calculates an instantaneous speed Ne(i) of the engine 20 as a function of a time interval Δt [sec.] that is a duration between latest rising and previous rising of the crank pulse signal and stores it in a memory. The ECU 30 also derives a change in instantaneous speed Ne(θ, i−1) every given angle θ of the crankshaft 22 (i.e., at an interval of a resolution of the crank angle sensor 23 which will also be referred to as a crank resolution below) after the TDC and calculates engine torque Te(θn−θn+1) that is the torque of the engine 20 produced within a given interval of the angular position of the crankshaft 22 (which will also be referred to as a crank position interval below) in each engine rotation pulsating period based on the change in instantaneous speed Ne(θ, i−1). For instance, the engine torque Te(j−1)(θn−θn+1) within the angle θ of the crankshaft 22 in the previous engine rotation pulsating period S[j−1] (i.e., a previous interval of 180° CA) is expressed by Eq. (1) below.

$$Te(j-1)(\theta n-\theta n+1) = -J \cdot ((\omega(j-1)(\theta n+1))^2 - (\omega(j-1)(\theta n))^2)/2 \quad (1)$$

where $\omega(\theta n)$ [rad/sec]=Ne($\theta n$)×360/60, and J is an inertia of the engine 20 which is calculated in advance based on design data on the engine 20 and stored in a memory of the ECU 30.

In the example of FIG. 2, when a current angular position of the crankshaft 22 is at 30° CA after the TDC, and it is required to predict a future speed of the engine 20 after 30° CA, the ECU 30 first calculates a current value of the instantaneous speed Ne(i) of the engine 20 (i.e., instantaneous speed Ne(30, i) in the example of FIG. 2) using the crank pulse signal and then determines the engine torque Te(0−30,i) according to Eq. (1) using the instantaneous speed Ne(30, i) and the instantaneous speed Ne(0, i), as derived immediately before the instantaneous speed Ne(30, i) is calculated. The ECU 30 stores the engine torque Te(0−30,i) in the memory. In the following discussion, the angular position of the crankshaft 22 after the TDC will also be referred to as a crank angle position below.

Subsequently, the ECU 30 uses the engine torque between a first position that is an angular position of the crankshaft 22 after the TDC in the previous 180° CA interval S[j−1] which is identical with one of engine speed prediction points at which the speed of the engine 20 should be now predicted and a second position that is an angular position of the crankshaft 22 at the engine speed prediction point immediately before the first position, i.e., the engine torque Te(j−1)(30−60) in the example of FIG. 2 and the current instantaneous speed Ne(30, i) to predict the speed Ne(60, i) at a crank angle of 60° CA as a predicted value of the speed of the engine 20 when the crank pulse signal will rise next. The ECU 30 also calculates a predicted travel time t(j)(30−60) that is the length of time required for the crankshaft 22 to advance from 30° CA to 60° CA. Further, the ECU 30 also uses the engine torque Te(j−1) (60−90) between crank angle positions of 60° CA and 90° CA in the previous 180° CA interval S[j−1] and the predicted speed Ne(60, i) of the engine 20 to predict the speed Ne(90, i) at a crank angle of 90° CA after the TDC and also to calculate a predicted travel time t(r) (60−90) that is the length of time required for the crankshaft 22 to advance from 60° CA to 90° CA in the current 180° CA interval S[j]. The ECU 30 repeats such operations to derive a sequence of predicted instantaneous values of the speed of the engine 20 when the number of revolutions of the engine 20 is decreasing and linearly interpolate the predicted instantaneous values to define a locus or line representing the speed of the engine 20 during decreasing of the speed of the engine 20. The predicted instantaneous values of the speed of the engine 20, as derived in the above manner, are indicated by black dots in FIG. 2. The predicted engine speed line is expressed by a broken line in FIG. 2.

The above predicting operation is initiated every input of the crank pulse signal from the crank angle sensor 23 to the ECU 30, i.e., every 30° CA and executed in a period of time until subsequent input of the crank pulse signal, thereby updating the predicted data for use in defining the predicted engine speed line. The predicted engine speed line which shows the speed of the engine 20 until it drops to zero may be made until subsequent input of the crank pulse signal. The ECU 30, however, may stop the predicting operation before the engine 20 stops completely. The predicting operation may alternatively be made by converting the instantaneous values of the speed of the engine 20 into values of angular velocity.

Figure 3:
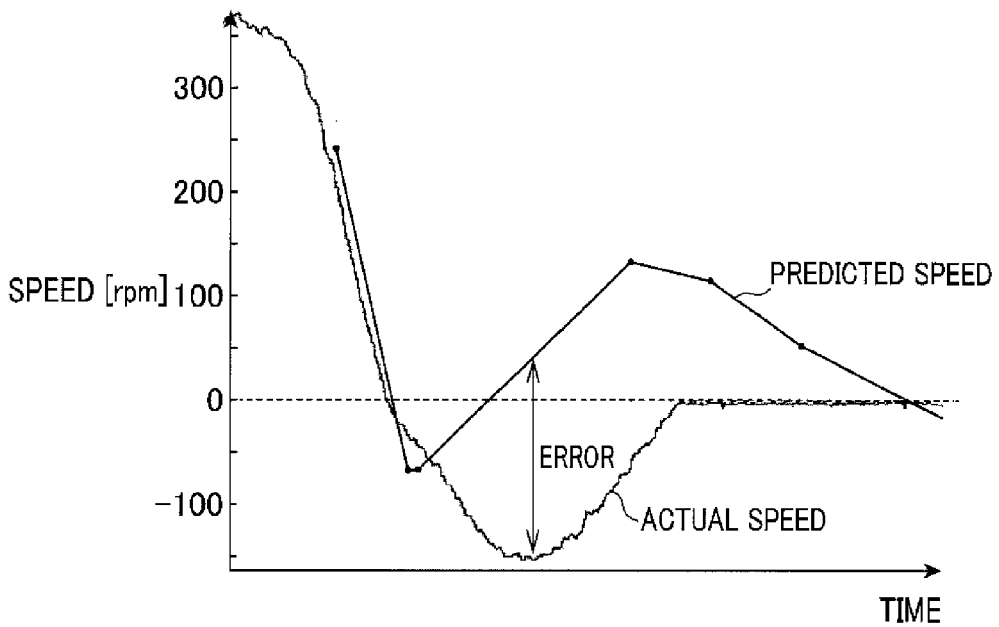
FIG. 3 is a graph which demonstrates predicted values of speed of an engine during forward and reverse rotation thereof, as calculated by a first calculator of the engine control system, and an actual speed of the engine.

Next, the predication of the speed of the engine 20, as made by the second calculator, will be discussed below. The first calculator, as described already, predicts a further speed of the engine 20 on the assumption that the loss energy in the engine 20 after the engine 20 stops burning the fuel will be constant at the same crank angle position, as expressed in terms of the position of the piston of the engine 20, in cycles of rotation of the crankshaft 22, but however, such an assumption is not satisfied between the cycles of rotation of the crankshaft 22 before and after the rotation of the engine 20 is changed from the forward direction to the reverse direction. This is because the torque produced by the engine 20 after the burning of fuel is stopped in the engine 20 is usually subjected to a loss arising from mechanical friction the piston will experience during stroke in the engine 20, and such a loss acts on the engine torque in a direction depending upon the direction of rotation of the engine, in other words, in opposite directions between the forward rotation and reverse rotation of the engine 20. The prediction of the speed of the engine 20 after the reversal of rotation of the engine 20 using the loss energy in the engine 20 which has occurred during forward rotation of the engine 20, that is, immediately before the reversal of rotation of the engine 20 will, therefore, result in decreased accuracy in determining predicted values of the speed of the engine 20 in a range where the engine 20 rotates in the reverse direction. Comparison between predicted values of the speed of the engine 20 during the forward and reverse rotation thereof, as calculated by the first calculator, and an actual speed of the engine 20 is shown in FIG. 3.

The prediction of the speed of the engine 20 after the rotation of the engine 20 is changed in the reverse direction is, therefore, based on the fact that the engine torque (i.e., the loss energy) while the engine 20 is rotating in the forward direction contains two components: one (which will also be referred to as friction component or friction torque below)

resulting from the mechanical friction between parts of the engine 20 (including the piston), as created by the stroke of the piston, and the other (which will also be referred to as compression component or compression torque below) arising from a change in volume of the combustion chamber of the engine 20, and the friction torque acts on the crankshaft 22 in opposite directions between the forward and reverse rotation of the engine 20.

Figure 4:
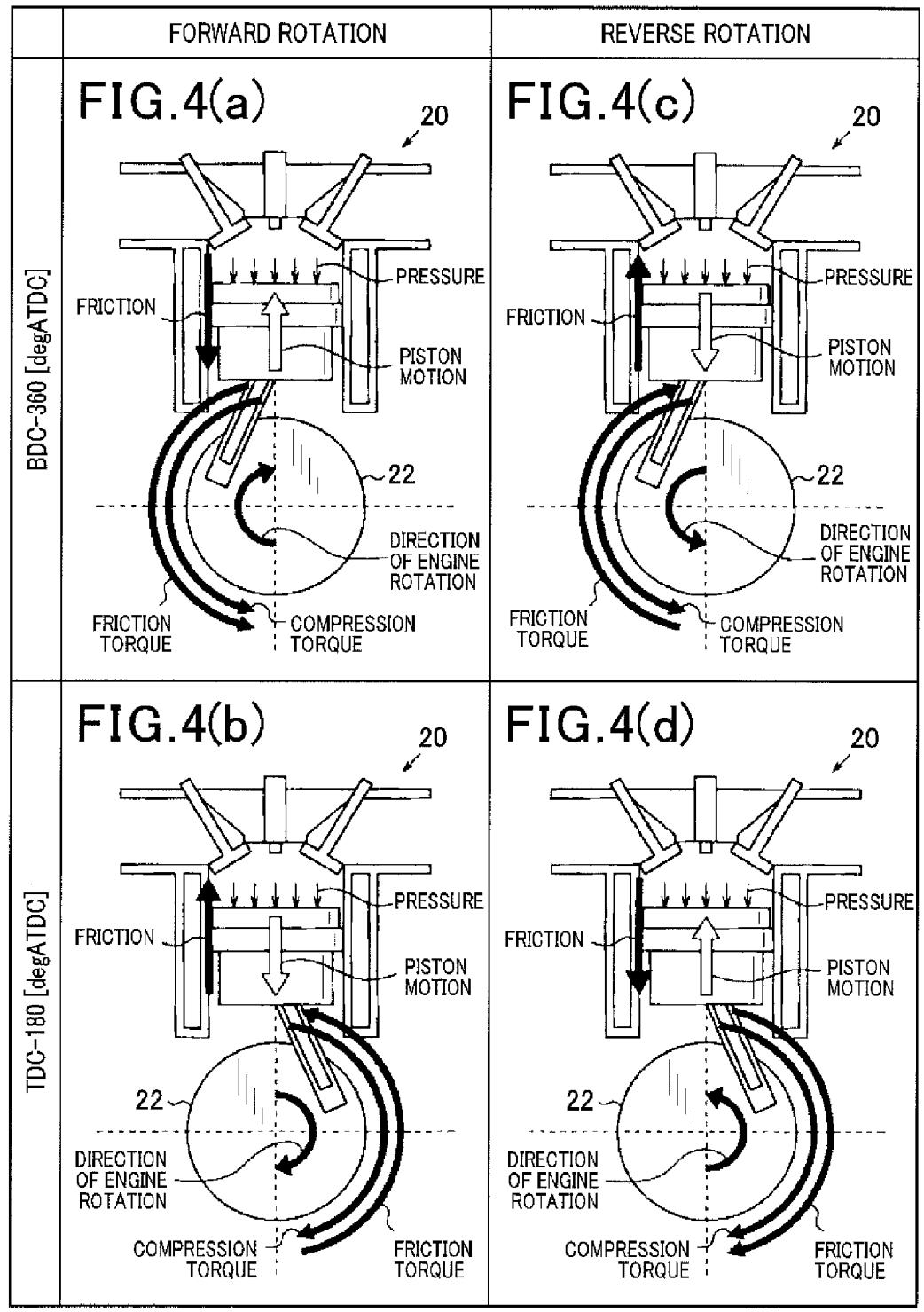
FIGS. 4(a) and 4(b) are schematic cross sectional views which demonstrate directions of components of engine torque, as produced during forward rotation of an engine.
FIGS. 4(c) and 4(d) are schematic cross sectional views which demonstrate directions of components of engine torque, as produced during reverse rotation of an engine.

How to calculate the engine torque while the engine 20 is rotating in the reverse direction will be described below in detail with reference to FIGS. 4(a) to 4(d). FIGS. 4(a) and 4(b) demonstrate the piston and the crankshaft 22 when the engine 20 is rotating in the forward direction. FIGS. 4(c) and 4(d) demonstrate the piston and the crankshaft 22 when the engine 20 is rotating in the reverse direction. FIGS. 4(a) and 4(c) represents a range of the crank angle position between the bottom dead center (BDC) and +180° CA, as defined in the forward direction of rotation of the engine 20, while FIGS. 4(b) and 4(d) represents a range of the crank angle position between the top dead center (TDC) and +180° CA, as defined in the forward direction of rotation of the engine 20. The examples of FIGS. 4(a) to 4(d) are in the condition that the pressure in the cylinder is higher than atmospheric pressure. Black arrows indicate directions in which the friction torque and the compression torque act on the crankshaft 22.

When the engine 20 (i.e., the crankshaft 22) rotates in the forward direction in the range of the BDC to +180° CA, as defined in the forward direction of rotation of the engine 20, both the friction torque and the compression torque are, as can be seen from FIG. 4(a), exerted on the crankshaft 22 in a direction opposite that of the rotation of the engine 20. When the engine 20 rotates in the reverse direction in the range of the BDC to +180° CA, as defined in the forward direction of rotation of the engine 20, the compression torque, as can be seen from FIG. 4(c), acts in the same direction as that when the engine 20 rotates in the forward direction, i.e., the direction in which the engine 20 now rotates, while the friction torque acts in a direction opposite that when the engine 20 rotates in the forward direction, i.e., the direction in which the engine 20 now rotates. Note that the range of the crank angle position between the BDC and +180° CA, as defined in the forward direction of rotation of the engine 20, is a range where when the engine 20 is rotating in the forward direction, the piston undergoes compression and exhaust strokes in which the volume of the combustion chamber in the cylinder decreases.

When the engine 20 (i.e., the crankshaft 22) rotates in the forward direction in the range of the TDC to +180° CA, as defined in the forward direction of rotation of the engine 20, the compression torque, as can be seen from FIG. 4(b), acts in the same direction as the direction in which the engine 20 now rotates, while the friction torque acts in a direction opposite the direction in which the engine 20 now rotates. When the engine 20 rotates in the reverse direction in the range of the TDC to +180° CA, as defined in the forward direction of rotation of the engine 20, the compression torque, as can be seen from FIG. 4(d), acts in the same direction as that when the engine 20 rotates in the forward direction, i.e., in a direction opposite the direction in which the engine 20 now rotates, while the friction torque acts in a direction opposite that when the engine 20 rotates in the forward direction, i.e., the direction in which the engine 20 now rotates. Note that the range of the crank angle position between the TDC and +180° CA, as defined in the forward direction of rotation of the engine 20, is a range where when the engine 20 is rotating in the forward direction, the piston undergoes intake and expansion strokes in which the volume of a combustion chamber in the cylinder increases. It is apparent from the above fact that after the engine 20 stops burning the fuel, the friction torque always acts on the crankshaft 22 in a direction opposite that of rotation of the engine 20, while the compression torque acts independently from the direction of rotation of the engine 20.

Specifically, when the piston moves in a direction from the BDC to the TDC during the forward rotation of the engine 20, the compression torque and the friction torque act against the rotation of the engine 20 (i.e., the crankshaft 22), while when the rotation of the engine 20 has been reversed, so that the piston moves in a direction from the TDC to the BDC, the friction torque acts against the rotation of the engine 20, but the compression torque assists the rotation of the engine 20.

Based on the above fact, the engine control system of this embodiment (i.e., the second calculator) reverses the sign (i.e., a positive or negative sign indicating the direction of rotation of the crankshaft 22) of one of the friction and compression components of the torque (i.e., the loss energy) of the engine 20, as produced while the engine 20 is rotating in the forward direction during decreasing of the speed of the engine 20, that is, the sign of the friction component, and defines the sum of the friction component whose sign is reversed and the compression component whose sign remains unchanged as the loss energy which is to appear in one of the engine rotation pulsating periods during the reverse rotation of the engine 20. The engine control system then uses such a loss energy to predict the speed of the engine 20 immediately after the rotation of the crankshaft 22 is changed to the reverse direction. This prediction will be discussed below in more detail.

If the sign of a direction opposite that in which the engine 20 rotates in the forward direction is defined as positive, the engine torque Te[Nm] is expressed by Eq. (2) below.

$$Te = Tef + Tec \quad (2)$$

where Tef is the friction torque, and Tec is the compression torque.

The sign of the friction torque when the engine 20 is undergoing a fuel cut is, as already described with reference to FIGS. 4(a) to 4(d), reversed between the forward and reverse rotation of the engine 20. Given that magnitude (i.e., absolute value) of the friction torque is constant, the friction torque Tef_n during the reverse rotation of the engine 20 is expressed according to Eq. (3) below using the friction torque Tef_p during the forward rotation of the engine 20.

$$Tef\_n = Tef\_p \quad (3)$$

Assuming that the average value of the compression torque Tec within one of strokes (e.g., intake or induction, compression, combustion, and exhaust strokes) of the piston (i.e., an interval of 180° CA in this embodiment) while the engine 20 is undergoing a fuel cut is zero, the friction torque Tef is expressed according to Eq. (4) below based on Eq. (2). Note that Eq. (4) indicates that the average value of the engine torque in one of the strokes of the piston is equal to the friction torque.

$$\int_{\theta_i}^{\theta_{i+n-1}} Te(\theta)s\theta = \int_{\theta_i}^{\theta_{i+n-1}} Tef(\theta)d\theta + 0$$

$$Tef = 1/n \int_{\theta_i}^{\theta_{i+n-1}} Te(\theta)d\theta \quad (4)$$

where n=720 [deg.]÷crank resolution [deg.]÷number of cylinders of the engine 20.

Given that the compression torque has a constant value at the same crank angle position after the TDC in the engine rotation pulsating periods when the engine 20 is undergoing a fuel cut, the compression torque Tec_n during the reverse rotation of the engine 20 is expressed according to Eq. (5)

below using the compression torque Tec_p during the forward rotation of the engine 20.

$$Tec\_n = Tec\_p = Te - Tef \quad (5)$$

Therefore, the engine torque Te_n during the reverse rotation of the engine 20 is expressed according to Eq. (6-1) below using the engine torque Te_p during the forward rotation of the engine 20.

$$Te\_n = Tef\_n + Tec\_n = Tef\_p + (Te\_p - Tef\_p) = Tef\_p - 2 \times Tef\_p \quad (6-1)$$

Eq. (6-1) is rewritten into Eq. (6-2) below using Eq. (4), as described above.

$$Te\_n = Te\_p - 2/n \int_{\theta_i}^{\theta_{i+n-1}} Te\_p(\theta) d\theta \quad (6-2)$$

Since the engine torque and the loss energy bear a proportional relation to each other, Eq. (6-2) is satisfied if the engine torque is replaced with the loss energy. The loss energy Eloss_n during the reverse rotation of the engine 20 is expressed by Eq. (7) below. Using Eq. (7), the loss energy Eloss_n is derived from the loss energy Eloss_p during the forward rotation of the engine 20. The loss energy Eloss_p is calculated using an output from the crank angle sensor 23 or the predicted speed Ne(i+1), as determined by the first calculator.

$$Eloss\_n = Eloss\_p - 2/n \int_{\theta_i}^{\theta_{i+n-1}} Eloss\_p(\theta) d\theta \quad (7)$$

where Eloss_p is the loss energy [rpm$^2$] during the forward rotation of the engine 20, and Eloss_n is the loss energy [rpm$^2$] during the reverse rotation of the engine 20.

How to predict the speed of the engine 20 after the rotation of the engine 20 is reversed will be described below.

When the direction in which the engine torque acts on the crankshaft 22 of the engine 20 is a direction to disturb the rotation of the engine 20, that is, decelerate the engine 20 during the forward rotation of the engine 20, it will be a direction to assist the rotation of the engine 20, that is, accelerate the engine 20 during the reverse rotation of the engine 20. Therefore, if a latest one of a sequence of angle points at each of which the crank angle sensor 23 has detected the angular position of the crankshaft 22 or an angular position of the crankshaft 22 corresponding to a latest one of a sequence of predicted values of the speed of the engine 20 which have already been derived is, as demonstrated in FIG. 5, defined as a reference point P(i), and an angle point at which the value of the speed of the engine 20 is to be predicted is defined as a prediction point P(i+1), a predicted speed Ne (i+1) that is expected as the value of the speed of the engine 20 at the prediction point P(i+1) is given by Eq. (8) below when the engine 20 is rotating in the forward direction or by Eq. (9) below after the engine 20 is reversed in rotation thereof. The definition of the symbol "i" applies to the above and following discussions. Note that when the loss energy acts in a direction opposite that when the engine 20 rotates in the forward direction, the sign of the loss energy is defined as positive.

$$Ne(i+1) = \sqrt{Ne(i)^2 - Eloss\_p(i \to i+1)} \text{ where } Ne(i) > 0 \text{ and } Ne(i)^2 - Eloss\_p(i \to i+1) > 0 \quad (8)$$

$$Ne(i+1) = \sqrt{Ne(i)^2 + Eloss\_n(i \to i+1)} \text{ where } Ne(i) < 0 \text{ and } Ne(i)^2 + Eloss\_n(i \to i+1) > 0 \quad (9)$$

where Ne(i) is the value of the speed of the engine 20 at the reference point P(i), Ne(i+1) is the value of the speed of the engine 20 at the prediction point P(i+1), Moss p(i→i+1) is the loss energy generated between the reference point PO and the predicted point P(i+1) when the engine 20 is rotating in the forward direction, and Eloss_n(i→i+1) is the loss energy created between the reference point P(i) and the predicted point P(i+1) when the engine 20 is rotating in the reverse direction.

It is assumed in this embodiment that the engine torque when the engine 20 is undergoing a fuel cut has a constant value at the same crank angular position after the TDC in preceding and subsequent ones of the engine rotation pulsating periods unless the rotation of the engine 20 is reversed. Consequently, in Eq. (8), as the loss energy Eloss_p(i→i+1) during the forward rotation of the engine 20, the loss energy, as created in the same interval of the crank angle positions one piston stroke in the engine 20 earlier (i.e., in a previous one of the engine rotation pulsating periods), is used. In Eq. (9), as the loss energy Eloss_n(i→i+1) after the reversal of rotation of the engine 20, the value derived by converting the loss energy, as created between points (i.e., the crank angle position interval, as described above, in one of the engine rotation pulsating periods during the forward rotation of the engine 20) which are identical with the reference point PO and the prediction point P(i+1), into the loss energy during the reverse rotation of the engine 20 using Eq. (7). For example, in FIG. 5, the interval between the points P(z) and P(i+1) and the interval between the points P(i−3) and P(i−2) are, as can be seen from the drawing, identical with each other in the angular position of the crankshaft 22 after the TDC. Accordingly, when it is required to calculate the predicted speed Ne(i+1) at the point P(i+1), the loss energy between the points P(i−3) and P(i−2) is used as Eloss_p in Eq. (7) to derive the loss energy Eloss_n between the points P(i) and P(i+1).

Figure 5:
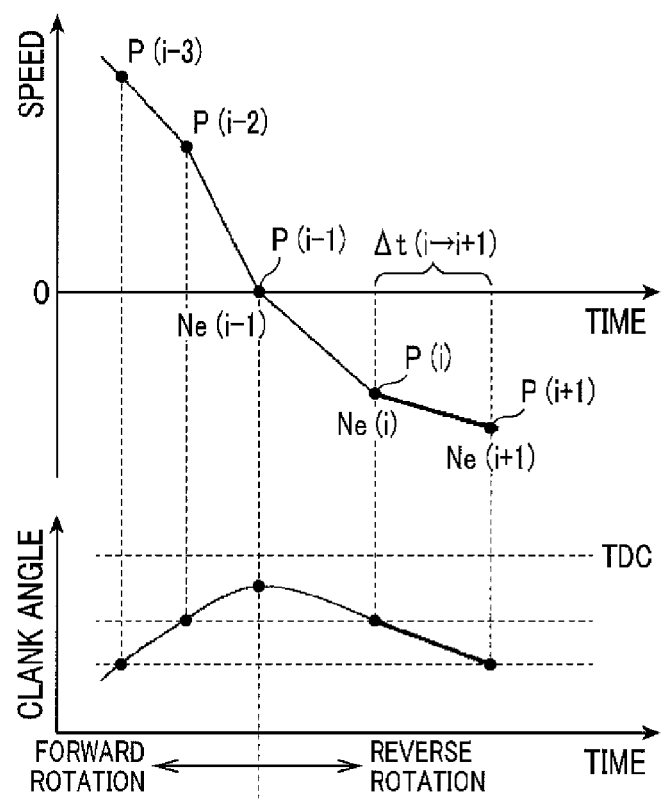
FIG. 5 is a graph which represents a sequence of angular positions of a crankshaft at each of which the speed of an engine is to be predicted and a change in angular position of the crankshaft when the crankshaft is rotating in a reverse and a forward direction.

As already described earlier, after the rotation of the engine 20 is changed from the forward direction to the reverse direction, the position of the piston of the engine 20 (i.e., crank angle position) advances in the reverse direction. The point P(i) in FIG. 5 is identical in the crank angle position with the point P(i−2) before the rotation of the engine 20 is reversed, that is, during the forward rotation of the engine 20. Similarly, the point P(i+1) is identical in the crank angle position with the point P(i−3) before the rotation of the engine 20 is reversed. It turns out from FIG. 5 that the loss energy occurring between the points P(i) and P(i+1) corresponds to that between the points P(i−3) and P(i−2) regardless of the direction of rotation of the engine 20, in other words, an absolute value of each of the compression torque and the friction torque between the points PO and P(i+1) is identical with that of a corresponding one of the compression torque and the friction torque between the points P(i−3) and P(i−2) and that the loss energy occurring between the points P(i−3) and P(i−2) during the forward rotation of the engine 20 may be used in Eq. (7) to derive the loss energy between the points P(z) and P(i+1).

The time interval Δt(i→i+1) between the reference point P(i) and the prediction point P(i+1) is expressed by Eq. (10) below regardless of the direction of rotation of the engine 20. Note that Δθ(i→i+1) in Eq. (10) is an angle through which the crankshaft 22 rotates from the reference point P(i) to the prediction point P(i+1), that is, the crank resolution.

$$\Delta t(i \to i+1) = 2 \times |\Delta\theta(i \to i+1)/(Ne(i) + Ne(i+1))| \quad (10)$$

Each of Eqs. (8) and (9) uses the loss energy occurring in an interval between the reference point P(i) and an angle point (i.e., the position of the crankshaft 22) to which the crankshaft 22 rotates from the reference point P(i) through an angle equivalent to the crank resolution to calculate the predicted speed of the engine 20 at an interval of a given angle of the crankshaft 22. However, when the rotation of the engine 20 (i.e., the crankshaft 22) has been reversed, the rotation of the pulsar 24 will be reversed, thus causing one of the protrusions 26 which has now passed the electromagnetic pickup 25 to return back to or reach the electromagnetic pickup 25 again. The interval between two of a sequence of outputs from the crank angle sensor 23 immediately before and after the reversal of rotation of the engine 20 is, thus, not always equal to the crank resolution, that is, the interval between adjacent two of the protrusions 26 (i.e., 30° CA in this embodiment). Accordingly, when the rotation of the engine 20 has been reversed between the reference point P(i) and the prediction point P(i+1), the ECU 30 calculates the speed of the engine 20 in a way, as described below, without use of Eqs. (8) and (9).

How to predict the speed of the engine immediately after the rotation of the engine 20 has reversed will be discussed with reference to FIG. 6 which demonstrates an example in which the rotation of the engine 20 is changed from the forward direction to the reverse direction.

The ECU 30 uses the loss energy in the engine rotation pulsating period during the forward rotation of the engine 20 to calculate the time when the rotation of the engine 20 has first reached zero, that is, the time when the rotation of the engine 20 has first changed from the forward direction to the reverse direction (which will also be referred to as a zero-arrival time below and is expressed in terms of the angular position of the crankshaft 22). The ECU 30 then determines an angle point, which corresponds to a position of the crankshaft 22 to which the crankshaft 22 is retarded or returned from its position at the zero-arrival time by an angle equivalent to a crank angle change $\Delta\theta(i\rightarrow 0)$ that is an angle through which the crankshaft 22 has rotated from the time of appearance of a lasted one of the crank pulse signals (i.e., the prediction points before the reversal of rotation of the crankshaft 22), as having been outputted from the crank angle sensor 23 during the forward rotation of the engine 20, to the zero-arrival time, as an angle point when the crank pulse signal has been first inputted to the ECU 30 immediately after the rotation of the engine 20 has been changed to the reverse direction, and calculates the predicted value of the speed of the engine 20 at such an angle point that is the prediction point P(i+1).

Figure 6:
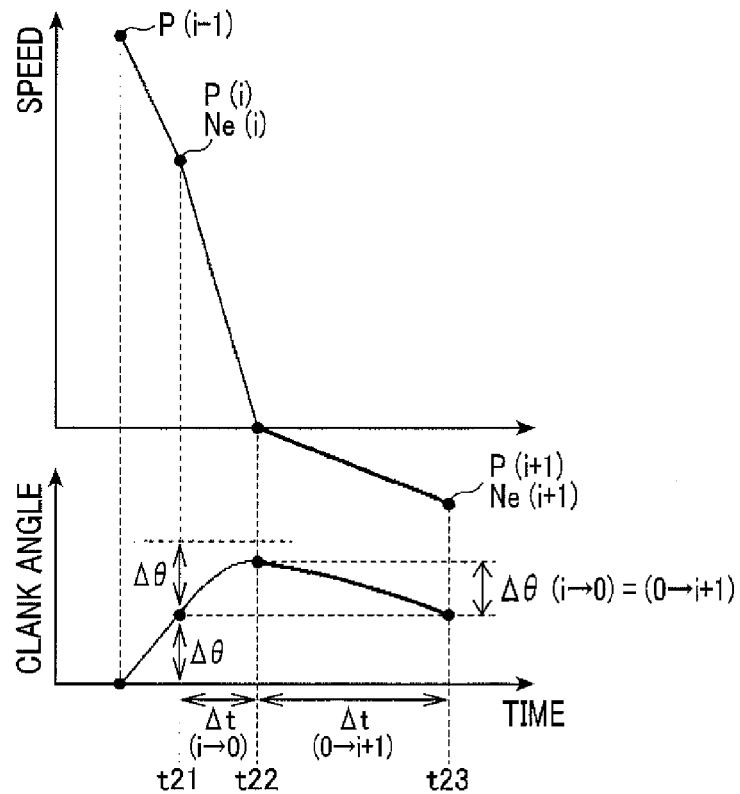
FIG. 6 is a graph which shows how to predict speed of an engine immediately after rotation of the engine is reversed.

Specifically, in FIG. 6, the loss energy Eloss(i→0), as consumed from the time of the reference point P(i) to the zero-arrival time, is calculated according to Eq. (11) below using the speed Ne(i) of the engine 20 at the reference point P0.

$$Eloss(i\rightarrow 0)=(Ne(i))^2-0=(Ne(i))^2 \quad (11)$$

Next, the loss energy Eloss_p(j−1)(i→i+1), as derived one piston stroke in the engine 20 earlier (i.e., in a previous one of the engine rotation pulsating periods), is used to calculate the zero-arrival time. Assuming that a ratio of the crank angle change $\Delta\theta(i\rightarrow 0)$ that is a change in angular position of the crankshaft 22 between the reference point P(i) and the zero-arrival time to a cycle $\Delta\theta$ of output of the crank pulse signal from the crank angle sensor 23 (i.e., 30° CA in this embodiment) is equal to a ratio of the loss energy Eloss(j)(i→0) between the time of the reference point P(i) and the zero-arrival time to the loss energy Eloss(j−1)(i→i+1) between the same crank angle position as that at the reference point P(i) in the previous engine rotation pulsating period and a subsequent output of the crank pulse signal from the crank angle sensor 23, the crank angle change $\Delta\theta(i\rightarrow 0)$ is expressed by Eq. (12) below.

$$\Delta\theta(i\rightarrow 0)/\Delta\theta=Eloss(j)(i\rightarrow 0)/Eloss(j-1)(i\rightarrow i+1)$$

$$\Delta\theta(i\rightarrow 0)=((Ne(i))^2/Eloss(j-1)(i\rightarrow i+1))\times\Delta\theta \quad (12)$$

Therefore, the time interval $\Delta t(i\rightarrow 0)$ between the reference point P(i) and the zero-arrival time (122 in FIG. 6) is given by Eq. (13) below.

$$\Delta t(i\rightarrow 0) = 2\times\Delta\theta(i\rightarrow 0)/\omega(i) \quad (13)$$

$$= 2\times 60/360\times Ne(i)/Eloss(j-1)(i\rightarrow i+1)\times\Delta\theta$$

where ω is angular velocity, as defined in Eq. (1).

The time t23 at which the crank pulse signal is first inputted to the ECU 30 after the rotation of the engine 20 is reversed corresponds to the point P(i+1) to which the position of the crankshaft 22 is returned back from the time 122 by an angle equivalent to the crank angle change $\Delta\theta(i\rightarrow 0)$ that is a change in angular position of the crankshaft 22 between the time 121 when the crank pulse signal is inputted to the ECU 30 finally during the forward rotation of the engine 20 and the zero-arrival time (i.e., t22). Therefore, a relation of $\Delta\theta(i\rightarrow 0)=\Delta\theta(i\rightarrow i+0)$ is satisfied. By converting the energy loss Eloss_p(j−1)(i→i+1) in the previous engine rotation pulsating period into the loss energy Eloss_n(j−1)(i→i+1) during the reverse rotation of the engine 20 using Eq. (7), Eq. (14) below is satisfied.

$$Eloss\_n(j-1)(i\rightarrow i+1) = (Eloss\_p(j-1)(i\rightarrow 1+1) - Efrc) - Efrc \quad (14)$$

$$= Eloss\_p(j-1)(i\rightarrow i+1) - 2\times Efrc$$

where Efrc is the friction component of the loss energy.

Assuming that a ratio of the crank angle change $\Delta\theta(0\rightarrow i+1)$ that is a change in angular position of the crankshaft 22 between the zero-arrival time and the time of the prediction point P(i+1) to the cycle $\Delta\theta$ of output of the crank pulse signal from the crank angle sensor 23 is equal to a ratio of the loss energy Eloss(j)(0→i+1) between the zero-arrival time and the prediction point P(i+1) to the loss energy Eloss_n(j−1)(i→i+1) during the reverse rotation of the engine into which the energy loss Eloss_p(j−1)(i→i+1) in the previous engine rotation pulsating period is converted, Eq. (15) below is satisfied.

$$Eloss(j)(0\rightarrow i+1)/Eloss\_n(j-1)(i\rightarrow i+1)=\Delta\theta(0\rightarrow i+1)/\Delta\theta$$

$$Eloss(j)(0\rightarrow i+1)=\Delta\theta(i\rightarrow 0)/\Delta\theta\times(Eloss\_n(j-1)(i\rightarrow i+1)) \quad (15)$$

Therefore, the predicted speed Ne(i+1) that is a value of the speed of the engine 20 expected to be at the prediction point P(i+1) and the time interval $\Delta t(0\rightarrow i+1)$ between the zero-arrival time and the prediction point P(i+1) are expressed by Eqs. (16) and (17) below. Using Eqs. (16) and (17), the value of the speed of the engine 20 at the time t23 when the crank pulse signal is first inputted to the ECU 30 after the rotation of the engine 20 is reversed is determined.

$$Ne(i+1) = -\sqrt{(0^2 - Eloss(j)(0\rightarrow i+1))} \quad (16)$$

$$= -\sqrt{(-\Delta\theta(i\rightarrow 0)/\Delta\theta\times Eloss\_n(j-1)(i\rightarrow i+1)}$$

$$\Delta t(0\rightarrow i+1) = 2\times |\Delta\theta(i\rightarrow 0)/(Ne(i+1)\times 360/60)| \quad (17)$$

Figure 7:
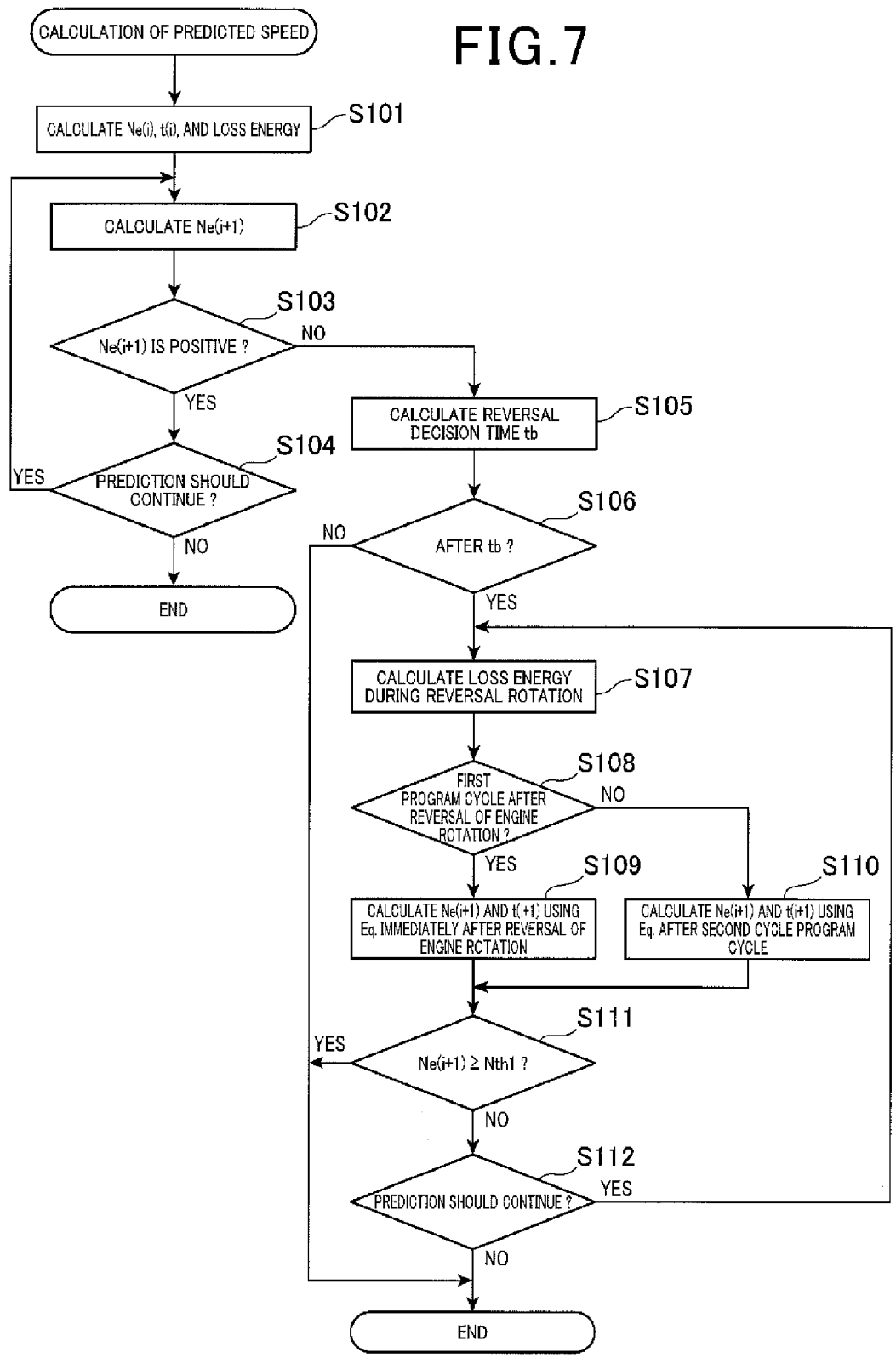
FIG. 7 is a flowchart of a sequence of logical steps or program to calculate a predicted value of speed of an engine.

Next, the operation to calculate the predicted value of the speed of the engine 20 will also be described with reference to a flowchart of FIG. 7. The program or a sequence of logical steps in FIG. 7 is executed by the ECU 30 at an interval of a given angular position of the crankshaft 22 (e.g., every 30°

CA in this embodiment) after stop of the engine upon satisfaction of the automatic engine stop condition.

After entering the program, the routine proceeds to step S101 wherein the instantaneous speed Ne(i) of the engine 20 is calculated using the crank pulse signals inputted to the ECU 30 in the manner, as described above, and the current time is defined as a sampling time t(i) that corresponds to the reference point P(i). Additionally, the loss energy Eloss(j)(i−1→i) is also calculated according to Eq. (1) using the instantaneous speed Ne(i) and the instantaneous speed Ne(i−1), as derived upon input of the crank pulse signal and then stored in the register. The routine proceeds to step S102 wherein the predicted speed Ne(i+1) that is expected as the value of the speed of the engine 20 at the prediction point P(i+1) is calculated according to Eq. (8), as described above. These operations are performed by the first calculator.

The routine proceeds to step S103 wherein it is determined whether the value of the predicted speed Ne(i+1), as derived in step S102, indicates the fact that the crankshaft 22 is rotating in the forward direction or not. Specifically, when $[Ne(i)^2-Eloss(i\to i+1)]>0$, the predicted speed Ne(i+1) is determined to have a positive value meaning that the crankshaft 22 is rotating in the forward direction. Alternatively, when $[Ne(i)^2-Eloss(i\to i+1)]<0$, the predicted speed Ne(i+1) is determined to have a negative value. If a YES answer is obtained in step S103, then the routine proceeds to step S104 wherein it is determined whether the prediction of the speed of the engine 20 should continue or not, that is, whether the ECU 30 is waiting for a subsequent input of the crank pulse signal from the crank angle sensor 23 or not. If a YES answer is obtained, then the routine returns back to step S102. The first calculator continues to calculate the predicted value of the speed of the engine 20 cyclically.

Alternatively, if a NO answer is obtained in step S103 meaning that the value of the predicted speed Ne(i+1), as calculated last according to Eq. (8), is determined to have been changed to negative, then the routine proceeds to step S105 wherein a reversal decision time tb that is the time when a given speed of the crankshaft 22 (e.g., zero or near-zero speed) is reached is determined based on the predicted speed Ne(i+1), as derived in step S102. The reversal decision time tb is the latest time in a time range where the pinion 11 is permitted to engage the ring gear 21 during the forward rotation of the engine 20. The reversal decision time tb usually depends upon the behavior of decreasing of the speed of the engine 20. The routine then proceeds to step S106 wherein it is determined that the current time is later than the reversal decision time tb or not. If a NO answer is obtained meaning that if a request to restart the engine 20 is made now, and the pinion 11 then starts to be thrust, it is possible to bring the pinion 11 into contact with the ring gear 21 during the forward rotation of the engine 20, it is concluded that there is no need for predicting the speed of the engine 20 during the reverse rotation of the engine 20. The routine then terminates.

Alternatively, if a YES answer is obtained in step S106, the routine performs following steps to predict the speed of the engine 20 during the reverse rotation thereof. This operation is, as described above, executed by the second calculator. Specifically, in step S107, the loss energy Eloss_n(j−1)(i→i+1) during the reverse rotation of the engine 20 is calculated according to Eq. (7) using a parameter of the energy loss Eloss_p(j−1)(i→i+1), as derived as occurring between corresponding angular positions of the crankshaft 22 when the engine 20 was rotating in the forward direction. The routine proceeds to step S108 wherein it is determined whether this cycle of execution of the program is the first one after the rotation of the engine 20 is reversed or not. If a YES answer is obtained, then the routine proceeds to step S109 wherein Eq. (16) that is an arithmetic expression to calculate the speed of the engine 20 immediately after the direction of rotation of the engine 20 is changed is used to calculate the predicted speed Ne(i+1). Additionally, Eq. (17) is also used to a prediction sampling time t(i+1) that corresponds to the prediction point P(i+1). Alternatively, if a NO answer is obtained in step S108, then the routine proceeds to step S110 wherein Eq. (9) that is an arithmetic expression to calculate the speed of the engine 20 at the second cycle of execution of this program (i.e., upon the second input of the crank pulse signals to the ECU 30) after the direction of rotation of the engine 20 is changed is used to calculate the predicted speed Ne(i+1). Additionally, Eq. (10) is also used to the prediction sampling time t(i+1).

After step S109 or S110, the routine proceeds to step S111 wherein it is determined whether a latest value of the predicted speed Ne(i+1), that is, the value of the predicted speed Ne(i+1), as derived in this program execution cycle is greater than or equal to a given criterion value Nth1 or not. The criterion value Nth1 is a value of the speed of the engine 20 at which the prediction (i.e., the program of FIG. 7) should be terminated and set to zero in this embodiment. The engine control system of this embodiment determines a period of time from when the rotation of the engine 20 (i.e., the crankshaft 22) is first reversed after the engine 20 stops burning the fuel and then starts dropping in speed thereof until the direction of rotation of the engine 20 is returned to the forward direction as an engine speed prediction time that is a period of time for which the prediction of the speed of the engine 20 should be made. In step S111, it is determined whether the engine speed prediction time has expired or not. The criterion value Nth1 may alternatively be set to a near-zero value immediately before or after the rotation of the engine 20 is returned to the forward rotation.

If a YES answer is obtained in step S111 meaning that the value of the predicted speed Ne(i+1) is greater than or equal to the criterion value Nth1 and that the engine 20 has just been returned to the forward rotation, then the routine terminates. Note that the predicted speed Ne(i+1) has a negative value when the engine 20 is rotating in the reverse direction. Alternatively, if a NO answer is obtained in step S111, then the routine proceeds to step S112 wherein it is determined whether the second calculator should continue the prediction of the speed of the engine 20 or not, in other words, whether the crankshaft 22 has rotated by, for example, 180° from the start of this program execution cycle or not. Alternatively, it may be determined whether a given period of time or a given number of inputs of the crank pulse signal from the crank angle sensor 23 has been reached or not. If a YES answer is obtained, then the routine returns back to step S107. Alternatively, if a NO answer is obtained, then the routine terminates.

The operation of the engine control system to control the starter 10 will be described below.

The engine control system is designed to analyze the predicted engine speed line or locus which, as described above, represents a change in speed of the engine 20 after the engine 20 stops burning the fuel and is defined using predicted values of the speed of the engine 20 and set a pinion travel inhibition period Tx that is a restart inhibition period in which the starter 10 is inhibited from being actuated in order not to bring the pinion 11 into contact or engagement with the ring gear 21 when the engine 20 is rotating in the reverse direction. When the automatic engine restart condition is encountered, and a restart request is made during the reverse rotation of the engine 20, the ECU 30 waits for expiry of the pinion travel inhibition period Tx and then starts thrusting the pinion 11 to the ring gear 21 for restarting the engine 20. The pinion travel inhibition period Tx is, as will be described later in detail, determined in view of a pinion-to-ring gear contact inhibition period of time Ty in which the pinion 11 should be inhibited from contacting or engaging with the ring gear 21 and a required travel period of time Tp that is a time required between start of travel of the pinion 11 and contact of the pinion 11 with the ring gear 21.

Figure 8:
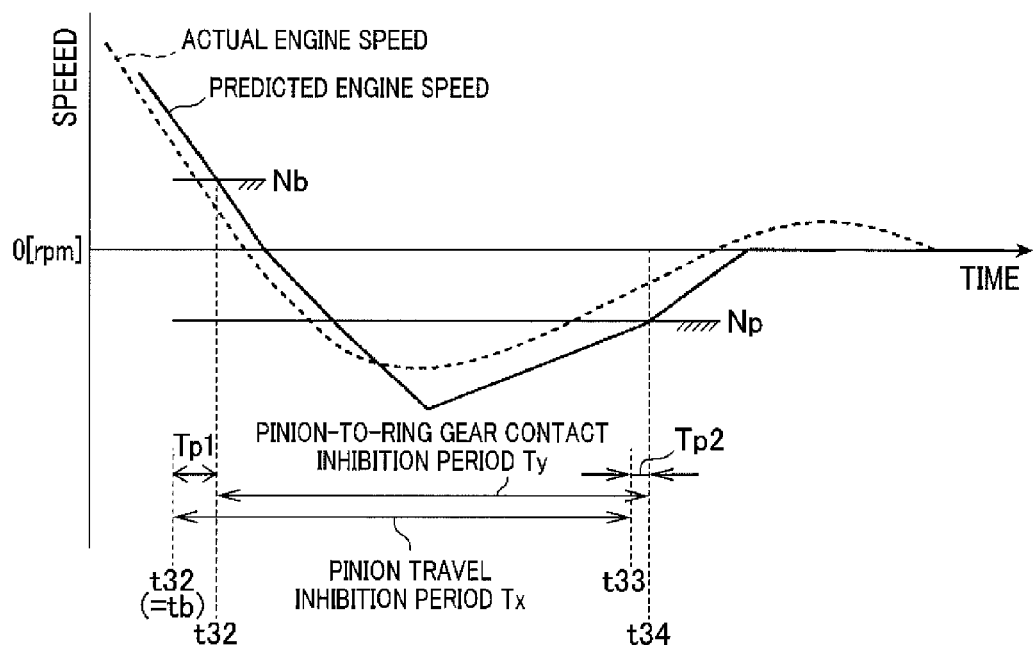
FIG. 8 is a graph which shows how to set a pinion travel inhibition period in which a pinion of a starter is inhibited from being moved toward a ring gear.

The pinion travel inhibition period Tx will also be described below with reference to FIG. 8. In a graph of FIG. 8, a solid line represents the predicted engine speed line. A broken line represents an actual change in speed of the engine 20. The predicted engine speed line is derived by linearly interpolating every adjacent two of the predicted values of the speed of the engine 20, as calculated by the first and second calculator of the ECU 30.

In the example of FIG. 7, an interval between time t32 at which the predicted value of the speed of the engine 20 has dropped below a reversal decision value Nb and time t34 at which the predicted value has exceeded a contact permissible value Np during dropping of the speed of the engine 20 after the engine 20 stops burning the fuel is determined as the pinion-to-ring gear contact inhibition period of time Ty. For example, the reversal decision value Nb is set to zero or a near-zero value (e.g., 0 to 50 rpm). The contact permissible value Np is set to −50 rpm. The ECU 30 determines the pinion travel inhibition period Tx based on the pinion-to-ring gear contact inhibition period of time Ty (i.e. t32 to t34). Specifically, time t31 which is earlier than time t32 at which the value of the speed of the engine 20, as represented by the predicted engine speed line, has dropped below the reversal decision value Nb by the required travel time Tp (i.e., Tp1 in FIG. 8) is defined as a start point. Time t33 which is earlier than time t34 at which the predicted value has exceeded the contact permissible value Np by the required travel time Tp (i.e., Tp2 in FIG. 8) is defined as an end point. The interval between the start point and the end point is determined as the pinion travel inhibition period Tx. In FIG. 8, "Tp1" indicates a maximum value of the required travel time Tp. "Tp2" indicates a minimum value of the required travel time Tp. In the example of FIG. 8, the start point and the end point of the pinion travel inhibition period Tx are set using the maximum value Tp1 and the minimum value Tp2 of the required travel time Tp.

For instance, when the automatic engine restart condition is met after time t31, but before time t33 during dropping of the speed of the engine 20, the ECU 30 waits until time t33 to actuate the starter 10. After a lapse of the required travel time Tp following start of movement of the pinion 11, the ECU 30 starts to energize the electric motor 12 to rotate the pinion 11 for cranking the engine 20. This minimizes mechanical noise arising from the engagement of the pinion 11 with the ring gear 21 and wear of them without sacrificing the speed of response of the ECU 30 to the engine restart request. The reversal decision value Nb is, as described above, set to a value greater than zero (e.g., 50 rpm) in light of an error in calculating the predicted value of the speed of the engine 20, but however, may be set to 0 rpm.

Figure 9:
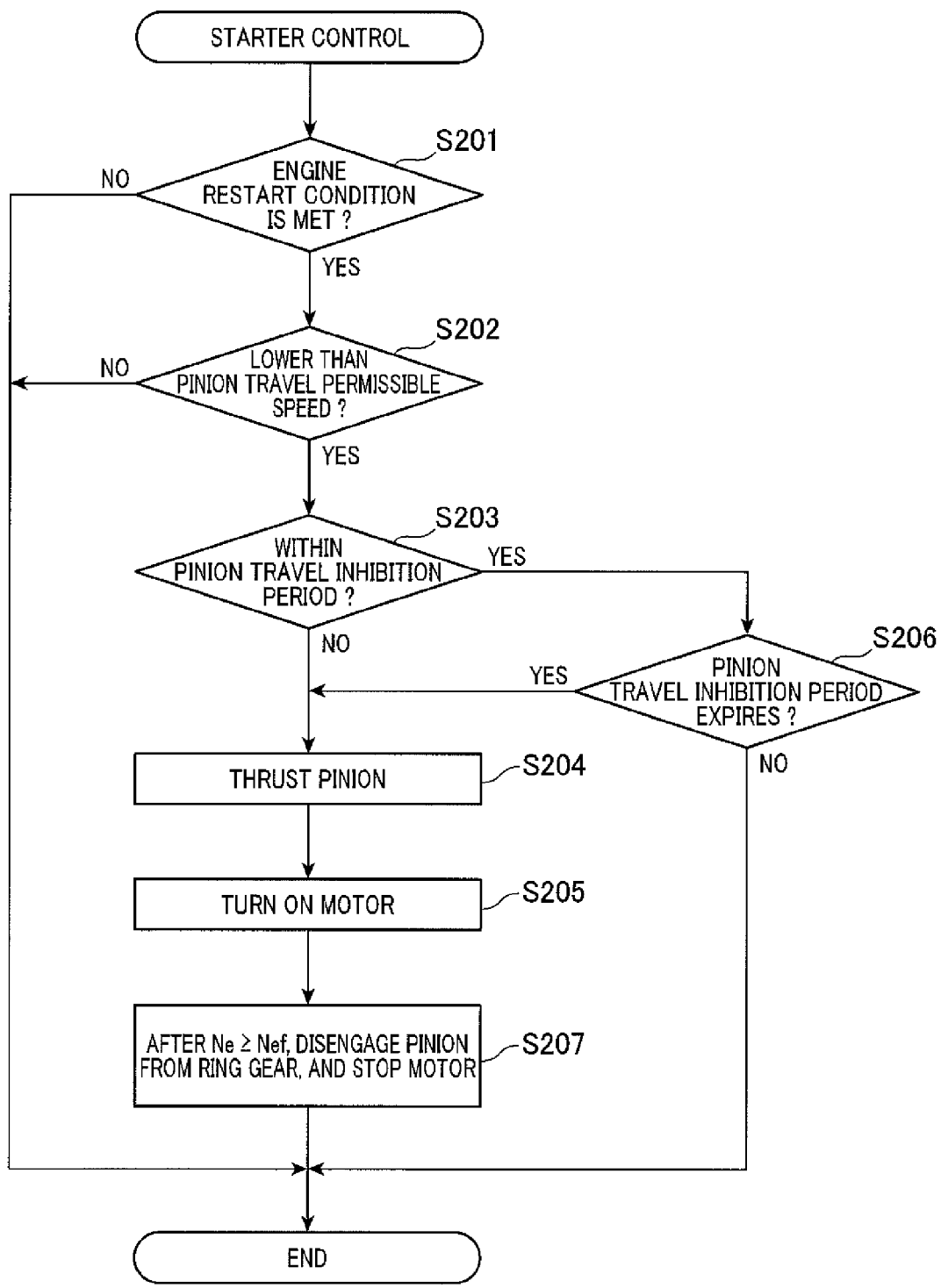
FIG. 9 is a flowchart of a sequence of logical steps or program to control an operation of a starter using the speed of the engine predicted in the program of FIG. 7.

FIG. 9 is a flowchart of a starter control program to control the operation of the starter 10. This program is executed at a given interval by the ECU 30 during a decrease in speed of the engine 20 after the automatic engine stop condition is encountered, so that the engine 20 stops burning the fuel.

After entering the program, the routine proceeds to step S201 wherein it is determined whether the automatic engine restart condition has been met or not. If a NO answer is obtained, then the routine terminates. Alternatively, if a YES answer is obtained, then the routine proceeds to step S202 wherein it is determined whether the engine speed is lower than or equal to a pinion travel permissible speed or not. The pinion travel permissible speed is an upper limit of a range of the speed of the engine 20 in which the starter 10 is permitted to move the pinion 11 into contact with the ring gear 21. The pinion travel permissible speed is set to, for example, 100 rpm. The engine speed, as compared with the pinion travel permissible speed, is the speed of the engine 20, as measured by the crank angle sensor 23 or predicted by the first calculator, as described above.

If a NO answer is obtained in step S202, the routine terminates. Alternatively, if a YES answer is obtained, then the routine proceeds to step S203 wherein it is determined whether the time when the automatic engine restart condition has been met in this program execution cycle is later than the start point (i.e., time t31 in the example of FIG. 8) of the pinion travel inhibition period Tx or not. If a NO answer is obtained meaning that the automatic engine restart condition has been satisfied before the pinion travel inhibition period Tx is reached, then the routine proceeds to step S204 wherein the ECU 30 outputs the on-signal to the pinion-driving relay 19 to actuate the starter 10. The starter 10 then thrusts the pinion 11 toward the ring gear 21. The routine then proceeds to step S205 wherein after a lapse of the travel time Tp since the pinion 11 started to be moved, the ECU 30 outputs the on-signal to the motor-driving relay 14 to actuate the electric motor 12 to rotate the pinion 11. The travel time Tp is, as described above, a period of time required between when the pinion 11 starts to be moved and when the pinion 11 travels to and contacts with the ring gear 21.

Alternatively, if a YES answer is obtained in step S203 meaning that the automatic engine restart condition has been satisfied within the pinion travel inhibition period Tx, then the routine proceeds to step S206 wherein it is determined whether the time when the automatic engine restart condition has been met in this program execution cycle is later than the end point (i.e., time t33 in the example of FIG. 8) of the pinion travel inhibition period Tx or not. If a NO answer is obtained meaning that the pinion travel inhibition period Tx does not yet expire, then the routine terminates. Alternatively, if a YES answer is obtained meaning that the automatic engine restart condition has been satisfied after expiry of the pinion travel inhibition period Tx, the routine then proceeds to steps S204 and S207 to apply the initial torque to the engine 20 through the starter 10.

After step S205, the routine proceeds to step S207 wherein when the condition where the speed Ne of the engine 20 is higher than an engine start speed Nef (e.g., 400 rpm to 500 rpm) has been met, the ECU 30 outputs the off-signals to the pinion-driving relay 19 and the motor-driving relay 14 to release the engagement of the pinion 11 with the ring gear 21 and also to stop the motor 12, thus terminating the cranking of the engine 20.

The engine control system of this embodiment offers the following advantages.

The ECU 30 of the engine control system, as described above, serves as either of the first calculator or the second calculator to predict a future speed of the engine 20 in the way different between during the forward rotation of the crankshaft 22 and during the reverse rotation of the crankshaft 22 because the pattern of decreasing of the speed of the engine 20 is usually different between the forward rotation and the reverse rotation of the crankshaft 22. This ensures the accuracy in calculating predicted values of the speed of the engine 20 while it is decreasing.

The loss energy will be, as described already, generated in a similar mode between preceding and following ones of the engine rotation pulsating periods during the forward rotation of the engine 20 while the speed thereof is decreasing, thus causing the speed of the engine 20 to drop in a similar pattern while pulsating between those two engine rotation pulsating periods. Such a condition is not met between two of the engine rotation pulsating periods before and after the rotation of the engine 20 is reversed. This is, as described above, because the compression component (which will also be referred to as a compression loss) of the loss energy acts on the crankshaft 22 in the same direction regardless of the direction of rotation of the engine 20, while the friction component (which will also be referred to as a friction loss) thereof depends upon the direction of rotation of the engine 20, that is, acts in directions different between during the forward rotation of the engine 20 and during the reverse rotation thereof. Therefore, based on the fact that the direction in which the friction loss acts on the crankshaft 22 during the forward rotation of the engine 20 is opposite that during the reverse rotation of the engine 20 at the same angular position of the crankshaft 22, the engine control system is engineered to predict the speed of the engine 20. Specifically, the engine control system reverses the sign of one of the friction and compression components of the loss energy of the engine 20, as produced in the engine rotation pulsating period during the forward rotation the engine 20, that is, the sign of the friction component, and defines the sum of the friction component whose sign is reversed and the compression component whose sign remains unchanged as the loss energy in the engine rotation pulsating period during the reverse rotation of the engine 20. The engine control system then uses such a loss energy to predict the speed of the engine 20 during the reverse rotation of the engine 20. The engine control system, therefore, calculates the speed of the engine 20 in view of the pattern of a change in the loss energy during the reverse rotation of the engine 20, thereby ensuring the accuracy in predicting the speed of the engine 20.

When the output (i.e., the crank pulse signal) of the crank angle sensor 23 is first inputted to the ECU 30, in other words, the time when the speed of the engine 20 should be predicted is reached first after the rotation of the engine 20 is reversed, Eq. (14) is used instead of Eq. (9) to predict the speed of the engine 20. The interval between two of a sequence of outputs from the crank angle sensor 23 immediately before and after the reversal of rotation of the engine 20 is not usually equal to the interval between adjacent two of the protrusions 26, which, as described above, leads to an error in calculating the speed of the engine 20. In order to alleviate such a problem, the engine control system of this embodiment uses Eq. (14) to predict the speed of the engine 20 for compensating for a change in interval between inputs of the crank pulse signal to the ECU 30 before and after the reversal of rotation of the engine 20.

The torque (i.e., the loss energy), as produced by then engine 20 after the engine 20 stops burning the fuel, is oriented in a direction to resist the rotation of the engine 20, that is, decelerate the engine 20 during the forward rotation of the engine 20 and in a direction to assist the rotation of the engine 20, that is, accelerate the engine 20 during the reverse rotation of the engine 20. Based on this fact, the engine control system develops Eq. (8) to predict the speed of the engine 20 when the engine 20 is rotating in the forward direction and Eq. (9) to predict the speed of the engine 20 when the engine 20 is rotating in the reverse direction. In other words, the engine control system determines a future speed of the engine 20 in view of the direction of application of torque to the crankshaft 22.

The engine control system of this embodiment, as described above analyzes the predicted values of the speed of the engine 20 to set the pinion travel inhibition period Tx in which the starter 10 is inhibited from being actuated. When the automatic engine restart condition is met within the pinion travel inhibition period Tx, the engine control system actuates the starter 10 to move the pinion 11 after expiry of the pinion travel inhibition period Tx. The engine control system is, as described above, capable of calculating the speed of the engine 20 highly accurately, thus resulting in increased accuracy of delimiting the pinion travel inhibition period Tx. This enables the starter 10 to be actuated to establish the engagement of the pinion 11 with the ring gear 21 at a desired time and also achieves a quick restart of the engine 20 after expiry of the pinion travel inhibition period Tx.

The engine control system of the second embodiment will be described below which is designed to predict the speed of the engine 20 during the reverse rotation of the engine 20 without use of the loss energy during the forward rotation of the engine 20.

Usually, an amount by which the output shaft (i.e., the crankshaft 22) of the engine 20 rotates in the reverse direction within an interval from the start of reversal of rotation of the crankshaft 22 until the rotation of the crankshaft 22 is returned to the forward direction depends upon an angular position of the crankshaft 22 at a given time (e.g., the reversal decision time tb or the time at which the speed of the engine 20 reaches zero) before the rotation of the engine 20 is changed to the reverse direction. Such an amount will also be referred to as a reverse rotation amount below. The peak of speed of the crankshaft 22 within a period of time in which the crankshaft 22 has first rotated by the reverse rotation amount after the rotation of the engine 20 is changed in the reverse direction during decreasing of the speed of the engine 20 will be greater as the angular position of the crankshaft 22 at the given time is closer to the TDC. Such a peak will also be referred to as a reversal peak value below. The ECU 30, therefore, calculates the angular position of the crankshaft 22 at a predetermined time before the crankshaft 22 starts to rotate in the reverse direction using the predicted value of the speed of the engine 20 during the forward rotation of the engine 20 while the speed of the engine 20 is decreasing and determines a value of the speed of the engine 20 after reversal of rotation of the engine 20 as a function of the calculated angular position of the crankshaft 22. The ECU 30 also determines the time when the pinion 11 should start to be moved and the time when the motor 12 should start to be actuated based on the determined value of the speed of the engine 20.

Figure 10:
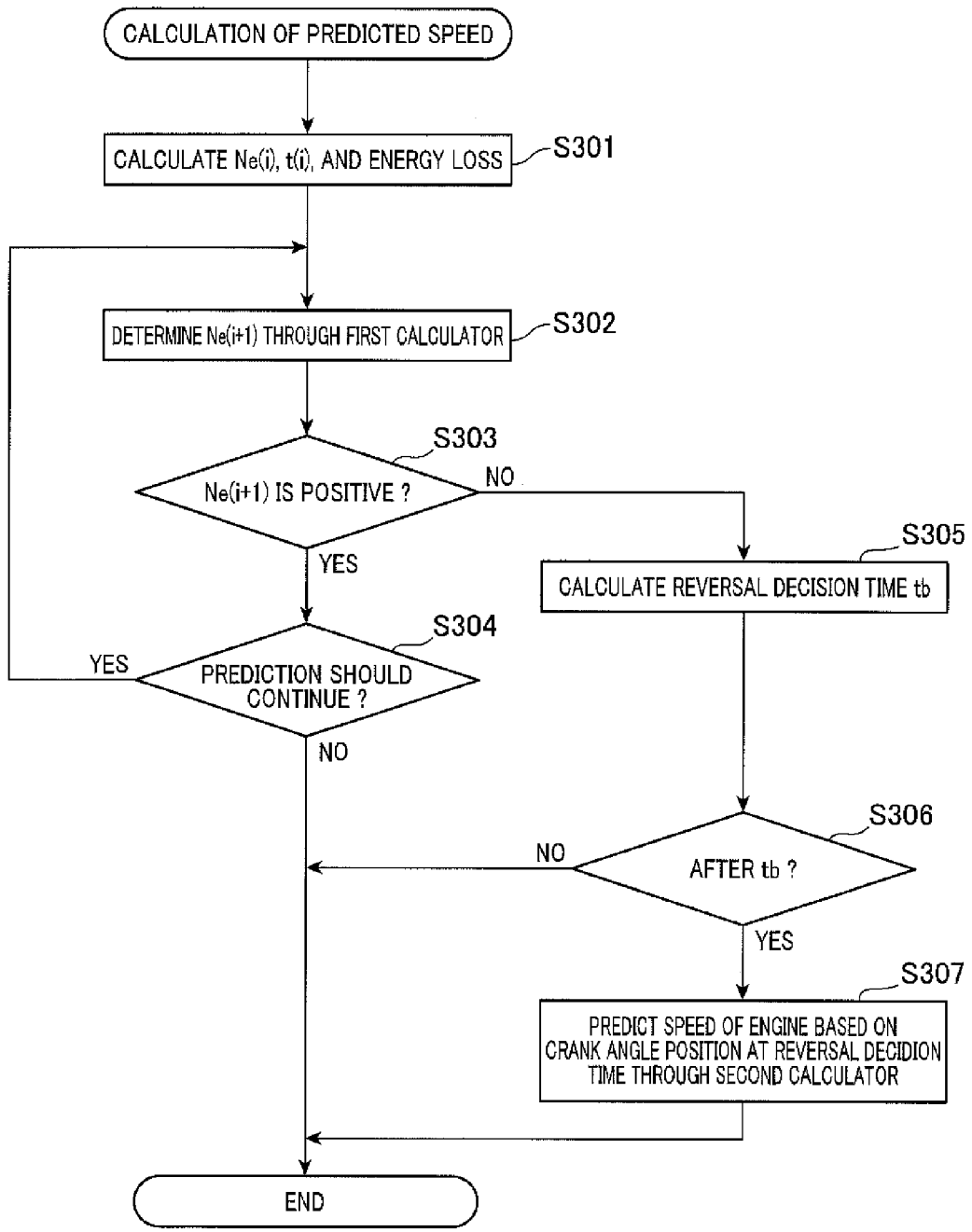
FIG. 10 is a flowchart of a sequence of logical steps or program to calculate a predicted value of speed of an engine in the second embodiment.

How to calculate the predicted value of the speed of the engine 20 cyclically in the second embodiment will also be described with reference to a flowchart of FIG. 10. The program of FIG. 10 is executed by the microcomputer of the ECU 30 at an interval of a given crank angle (e.g., every 30° CA) after stop of the engine upon satisfaction of the automatic engine stop condition.

Steps S301, S302, S303, S305, and S306 are identical in operation with steps S101, S102, S103, S105, and S106 in FIG. 7, and explanation thereof in detail will be omitted here.

Figure 11:
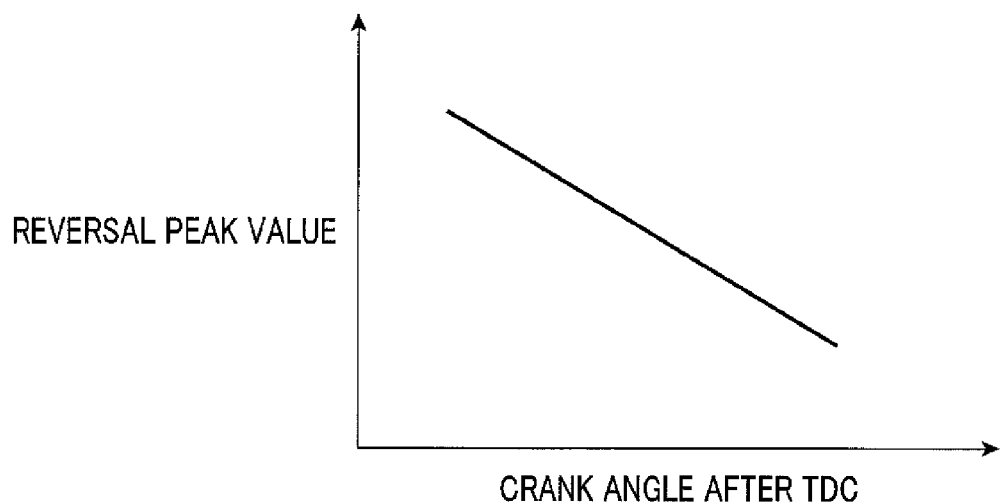
FIG. 11 is a view which shows a map representing a relation between a reversal peak value and an angular position of a crankshaft after TDC.

If a YES answer is obtained in step S306 meaning that the reversal decision time tb has passed, then the routine proceeds to step S307 wherein an angular position of the crankshaft 22 at the reversal decision time tb is calculated using the predicted speed Ne(i+1), as derived in steps S302 to 304. Additionally, the calculated angular position of the crankshaft 22 is used (by the second calculator) to determine the predicted value of speed of the engine 20 during the reverse rotation of the engine 20. The ECU 30 stores in a reverse speed predicting map which represents a relation between a value of the crank angle position (i.e., the angular position of the crankshaft 22 from the TDC) at the reversal decision time tb and the reversal peak value that is, as described above, the peak of speed of the crankshaft 22 within a period of time in which the crankshaft 22 has first rotated by the reverse rotation amount after the rotation of the engine 20 is changed in the reverse direction during decreasing of the speed of the engine 20. The ECU 30 reads the reversal peak value out of the reverse speed predicting map which corresponds to the value of the crank angle position at the reversal decision time tb in this program execution cycle and uses that reversal peak value to define the predicted engine speed line representing the speed of the engine 20 during the current reverse rotation of the engine 20 when the speed of the engine 20 is decreasing. Specifically, referring to FIG. 8, the ECU 30 makes the predicted engine speed line using the time t32 that is the start point of the pinion-to-ring gear contact inhibition period of time Ty, the reversal peak value, as read out of the reverse speed predicting map, and the time t34 that is the end point of the pinion-to-ring gear contact inhibition period of time Ty. The reverse speed predicting map is exemplified in a graph of FIG. 11. The reverse speed predicting map shows that the smaller the crank angle position, in other words, the closer the crank angle position to the TDC, the smaller the reversal peak value is. The start point (i.e., time t32) of the pinion-to-ring gear contact inhibition period of time Ty is derived from the predicted speed Ne(i+1), as determined in steps S302 to S304. The end point (i.e., time t34) of the pinion-to-ring gear contact inhibition period of time Ty is derived, for example, by look-up using a map representing a negative correlation of the pinion-to-ring gear contact inhibition period of time Ty to the reversal peak value or a map representing a positive correlation of the pinion-to-ring gear contact inhibition period of time Ty to the value of the crank angle position.

Figure 12:
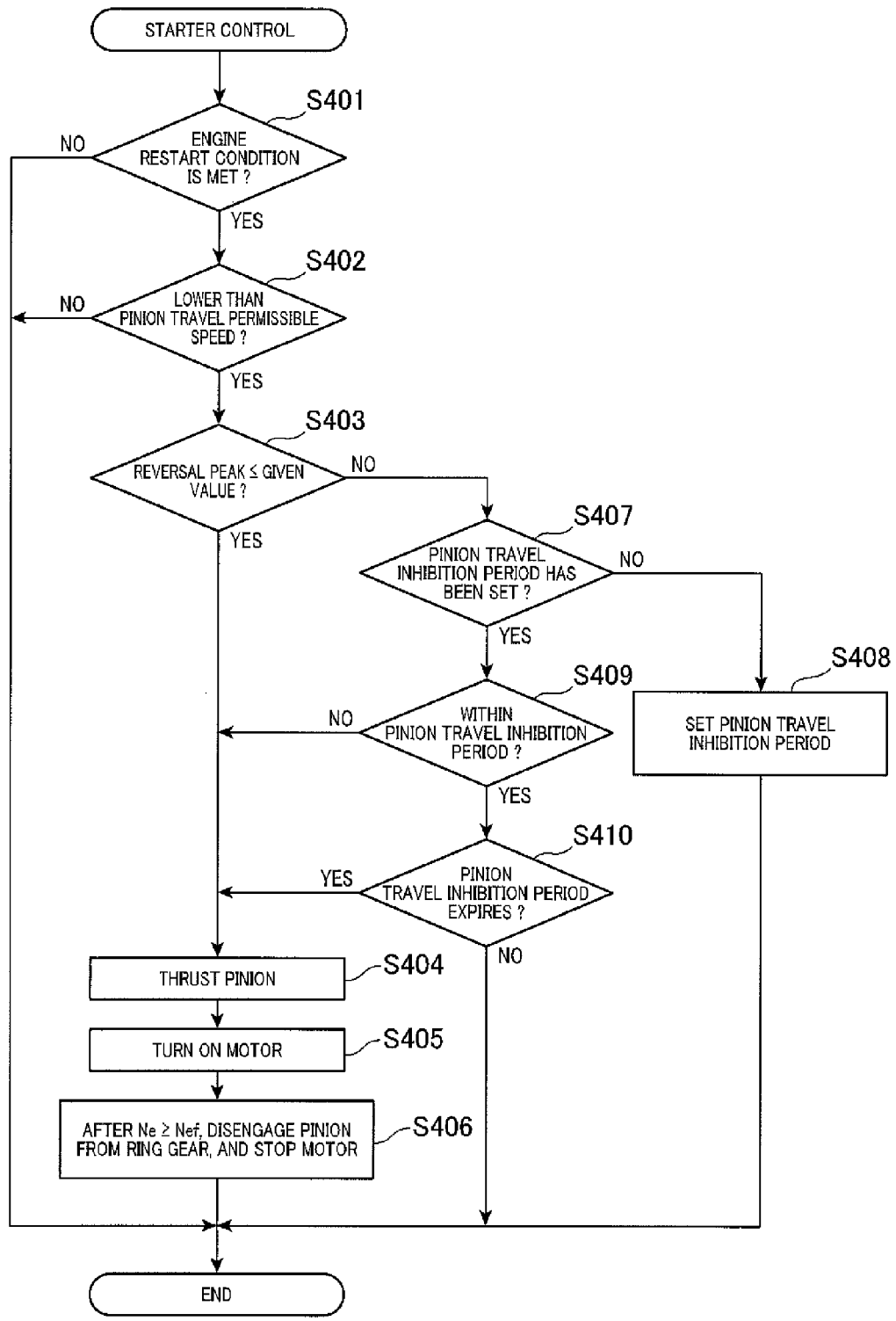
FIG. 12 is a flowchart of a sequence of logical steps or program to control an operation of a starter using the speed of the engine predicted in the program of FIG. 10.

FIG. 12 is a flowchart of a starter control program to control the operation of the starter 10 in the second embodiment. This program is executed at a given interval by the ECU 30 during a decrease in speed of the engine 20 after the automatic engine stop condition is encountered, so that the engine 20 stops burning the fuel. Steps S401, S402, S404, S405, and S406 are identical in operation with steps S201, S202, S204, S205, and S207 of FIG. 9, respectively. Steps S409 and S410 are identical in operation with steps S203 and S206 of FIG. 9, respectively. These operations will be omitted here.

If a YES answer is obtained in step S402 meaning that the engine speed has dropped below the pinion travel permissible speed, then the routine proceeds to step S403 wherein it is determined whether the reversal peak value, derived through the program of FIG. 10, is smaller than or equal to a given criterion value or not. The criterion value is an upper limit of a range of the speed of rotation of the crankshaft 22 in which the pinion 11 is permitted to engage the ring gear 21 for starting the engine 20 during the reverse rotation of the engine 20 and set to, for example, 200 rpm.

If a YES answer is obtained meaning that the reversal peak value is smaller than or equal to the given criterion value, then the routine proceeds to step S404. The ECU 30 output the on-signal to the pinion-driving relay 19 to actuate the starter 10. The starter 10 then thrusts the pinion 11 toward the ring gear 21. The routine then proceeds to step S405 wherein after a lapse of the travel time Tp since the pinion 11 started to be moved, the ECU 30 outputs the on-signal to the motor-driving relay 14 to actuate the electric motor 12 to rotate the pinion 11.

Alternatively, if a NO answer is obtained in step S403 meaning that the reversal peak value is greater than the given criterion value, then the routine proceeds to step S407 wherein it is determined whether the pinion travel inhibition period Tx has been already set or not. If a NO answer is obtained, then the routine proceeds to step S408 wherein the pinion travel inhibition period Tx is determined. Specifically, the length of the pinion travel inhibition period Tx is determined as a function of the reversal peak value. More specifically, the start point of the pinion travel inhibition period Tx is set to the time which is earlier than when the predicted speed of the engine 20 (i.e., the value on the predicted engine speed line) drops below the reversal decision value Nb by the travel time Tp. The travel time Tp is, as described above, a period of time required between when the pinion 11 starts to be moved and when the pinion 11 travels to and contacts with the ring gear 21. The end point of the pinion travel inhibition period Tx is set to the time which is later than the start point by an amount of time, as selected as a function of the reversal peak value. For instance, the value of the pinion-to-ring gear contact inhibition period of time Ty is determined by look-up using a map defined to represent a negative correlation of the pinion-to-ring gear contact inhibition period of time Ty to the reversal peak value. The time, which is earlier than an elapsed time of the determined value of the pinion-to-ring gear contact inhibition period of time Ty since the predicted value of the speed of the engine 20 drops below the reversal decision value Nb by the travel time Tp, is determined as the end point of the pinion travel inhibition period Tx. Alternatively, the pinion travel inhibition period Tx is predicted directly by look-up using a map defined to represent a negative correlation of the pinion-to-ring gear contact inhibition period of time Ty to the value of the crank angle position. The predicted pinion travel inhibition period Tx is used to set the end point thereof. In other words, the pinion travel inhibition period Tx is derived directly from the map as a function of the value of the crank angle position without use of the reversal peak value.

If a YES answer is obtained in step S407 meaning that the pinion travel inhibition period Tx has already been set, then the routine proceeds to step S409 wherein it is determined whether the time when the automatic engine restart condition has been met in this program execution cycle is later than the start point (i.e., time t31 in the example of FIG. 8) of the pinion travel inhibition period Tx or not. If a NO answer is obtained meaning that the automatic engine restart condition has been satisfied before the pinion travel inhibition period Tx is reached, then the routine proceeds to steps S404 and S405 for restarting the engine 20 through the starter 10. Alternatively, if a YES answer is obtained in step S409, then the routine proceeds to step S410 wherein it is determined whether the time when the automatic engine restart condition has been met in this program execution cycle is later than the end point (i.e., time t33 in the example of FIG. 8) of the pinion travel inhibition period Tx or not. If a YES answer is obtained, then the routine proceeds to step S404. Alternatively, if a NO answer is obtained in step S410 or after step S408, the routine terminates.

The engine control system of the second embodiment offers the following advantages.

The engine control system is, as described above, designed to calculate the predicted value of the speed of the engine 20 during the reverse rotation of the engine 20 as a function of the crank angle position at a given time before the start of reversal of the rotation of the engine 20 based on the fact that the reverse rotation amount that is an amount by which the output shaft (i.e., the crankshaft 22) of the engine 20 rotates in the reverse direction immediately after the reversal of rotation of the engine 20 per unit time depends upon an angular position of the crankshaft 22 at the given time (e.g., the reversal decision time tb or the time at which the speed of the engine 20 reaches zero) before the start of reversal of rotation of the engine 20. In other words, the engine control system, like in the first embodiment, serves as either of the first calculator or the second calculator to predict a future speed of the engine 20 in the way different between during the forward rotation of the crankshaft 22 and during the reverse rotation of the crankshaft 22. This ensures the accuracy in calculating predicted values of the speed of the engine 20 while it is decreasing. Use of such a predicted speed of the engine 20 enables the ECU 30 to set the time when the starter 10 should be actuated to bring the pinion 11 into engagement with the ring gear 21 for restarting the engine 20.

Usually, the engine 20 is subjected to the forward rotation and the reverse rotation cyclically after the fuel stops to be burned in the engine 20. The reverse rotation amount will be maximized after the rotation of the engine 20 is first changed to the reverse direction and then decreased gradually. It is preferable that the pinion 11 is inhibited from moving into engagement with the ring gear 21 when the engine 20 is rotating in the reverse direction after the first change in rotation of the engine 20 to the reverse direction. When the reverser rotation amount is small during the reverse rotation of the engine 20, the engagement of the pinion 11 with the ring gear 21 results in less mechanical noise and less wear of the pinion 11 and the ring gear 21.

Accordingly, when the peak of the reverse rotation amount is determined to be less than a given value, the engine control system permits the starter 10 to be actuated to bring the pinion 11 into engagement with the ring gear 21 even when the engine 20 is rotating in the reverse direction. Basically, the engine control system works to actuate the starter 10 to thrust the pinion 11 toward the ring gear 21 at the moment the automatic engine restart condition is met while the speed of the engine 20 is decreasing. However, when the peak of the reverse rotation amount is expected to be greater than the given value, the engine control system inhibits the starter 10 from being actuated to move the pinion 11 to the ring gear 21 during the reverse rotation of the engine 20, that is, starts to actuate the starter 10 after a lapse of a given period of time since the automatic engine restart condition is satisfied, and an engine restart request is made. This enables the starter 10 to be actuated to establish the engagement of the pinion 11 with the ring gear 21 at a time when the problem arising from such engagement will not occur and also to achieve a quick restart of the engine 20 when there is no possibility of the above problem.

The structure or operation of the engine control system in either of the first and second embodiments may be modified, as described below.

The engine control system of the first embodiment works to determine the pinion travel inhibition period Tx as a function of the predicted value of the speed of the engine 20 and, when the automatic engine restart condition is encountered in the travel inhibition period Tx, start to move the pinion 11 after the travel inhibition period Tx expires, but may be engineered to determine whether the peak of speed of the crankshaft 22 within a period of time in which the crankshaft 22 has first rotated by the reverse rotation amount after the rotation of the engine 20 is changed in the reverse direction during decreasing of the speed of the engine 20 (i.e., the reversal peak value) is smaller than or equal to a given criterion value or not using the predicted value of the speed of the engine 20 and permits the pinion 11 to contact with the ring gear 21 during the reverse rotation of the crankshaft 22 when the reversal peak value is determined to be smaller than or equal to the given criterion value. Specifically, when the reversal peak value is determined to be smaller than or equal to the given criterion value, and the engine restart request is made, the ECU 30 immediately starts to move the pinion 11 toward the ring gear 21 regardless of whether the event that the pinion contacts with the ring gear 23 will occur during the forward rotation or during the reverse rotation of the engine 20. Alternatively, when the reversal peak value is determined to have exceeded the given criterion value, the ECU 30 inhibits the starter 10 from being actuated to move the pinion 11 to the ring gear 21 during the reverse rotation of the engine 20. In other words, when it is predicted that when the engine restart request is made, and the ECU 30 immediately starts to move the pinion 11, the pinion 11 will contact with the ring gear 21 during the reverse rotation of the engine 20, the ECU 30 waits for a given fixed period of time and then starts to thrust the pinion 11 toward the ring gear 21.

The engine control system of the first embodiment, as can be seen from FIG. 8, sets an interval from when the predicted value of the speed of the engine 20 drops below the reversal decision value Nb until the predicted value of the speed of the engine 20 exceeds the contact permissible value Np as the pinion-to-ring gear contact inhibition period of time Ty, but however, may determine a period of time in which the predicted value of the speed of the engine 20 remains below a given value (e.g., the reversal decision value Nb) or in which the predicted value of the speed of the engine 20 is lower than a given value during the reverse rotation of the engine 20 as the pinion-to-ring gear contact inhibition period of time Ty.

The first calculator of the engine control system in the first embodiment works to calculate the predicted value of the speed of the engine 20 as a function of the loss energy while the speed of the engine 20 is decreasing, but may be designed to predict the speed of the engine 20 without use of the loss energy. For example, the first calculator may be designed to predict a future speed of the engine 20 as a function of a change in speed of the engine 20, as sampled during the decreasing of speed of the engine 20. Specifically, the first calculator samples an output from the crank angle sensor 23 to calculate the instantaneous speed of the engine 20 cyclically and predict a future value of the speed of the engine 20 using the values of the instantaneous speed of the engine 20, as derived over the cycles.

The engine control system of the second embodiment sets a given time before the start of reversal of rotation of the crankshaft 22 as the reversal decision time tb and predict the speed of the engine 20 during the reverse rotation of the engine 20 based on the angular position of the crankshaft 221 at the reversal decision time tb, but however, may determine a time when the speed of the engine 20 has reached zero (i.e., the zero-arrival time) as the reversal decision time tb and predict a future speed of the engine 20 during the reverse rotation of the engine at an angular position of the crankshaft 22 at the reversal decision time tb (i.e., the zero-arrival time).

The engine control system of the second embodiment stores the reverse speed predicting map which represents a relation between the angular position of the crankshaft 22 at a given time (e.g., the reversal decision time tb) set before the start of reverse rotation of the crankshaft 22 and the reversal peak value that is the peak of the reverse rotation amount and predict the speed of the engine 20 using the reverse speed predicting map, but however, may be designed to store a relation between a given parameter correlating with an angular position of the crankshaft 22 at a given time set before the start of reverse rotation of the crankshaft 22 and the reversal peak value and predict the speed of the engine 20 during the reverse rotation of the engine 20 using the stored relation. The given parameter may be the speed of the engine 20 at a time when the position of the crankshaft 22 reaches the TDC last before the speed of the engine 20 first drops to zero following the automatic stop of the engine 20.

The engine control system is equipped with the pinion-driving relay 19 which works to energize or deenergize the coil 18 and the motor-driving relay 14 which works to energize or deenergize the electric motor 12, but may be designed to have a motor energization control relay. For example, in the structure of FIG. 1, a motor energizing contact is disposed on an end of the plunger 17 opposite an end thereof to which the lever is connected instead of the motor-driving relay 14 and the power supply relay 15. The motor energization control relay is disposed between the motor 12 and the battery 16. The motor energization control relay is designed to be closed or turned on to supply the electric power from the battery 16 to the motor 12 when the motor energizing contact is closed by the movement of the plunger 17 which brings the pinion 11 into engagement with the ring gear 22. In other words, the supply of power to the motor 12 starts following or after completion of the movement of the plunger 17. The motor energization control relay may also be designed to be turned on or off in response to an on/off signal outputted from the ECU 30. The ECU 20 may control the operations of the pinion-driving relay 19 and the motor energization control relay independently from each other to achieve the engagement of the pinion 11 with the ring gear 21 and the actuation of the motor 12 separately.

The engine control system of either of the first and second embodiment, as described above, controls the movement of the pinion 11 and the actuation of the motor 12 separately, however, may be engineered to start actuating the motor 12 after a lapse of a given period of time since the pinion 11 starts to be moved. The given period of time is constant, which may cause the motor 12 to start to be actuated too early to rotate the pinion 11 when the pinion 11 engages the ring gear 21 during the reverse rotation of the engine 20, so that torque which will act on the crankshaft 22 in the forward rotation is applied to the crankshaft 22 now rotating in the reverse direction, thus resulting in a failure in restarting the engine 20. This accelerates the wear of the pinion 11 and the ring gear 21. The engine control system may also be designed to set an interval between start of movement of the pinion 11 and start of actuation of the motor 12 to be long in order to avoid the actuation of the motor 12 during the reverse rotation of the engine 20, which may result in a delay in response of the system to an engine restart request. The engine control system of either of the first and second embodiment is, however, capable of predicting a future speed of the engine 20 during the reverse rotation thereof accurately, thus resulting in decreased wear of the pinion 11 and the ring gear 21 and ensuring the startability of the engine 20.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An engine speed predicting system for a vehicle comprising:
a first calculator which works to calculate a predicted value of speed of an engine mounted in a vehicle during forward rotation of an output shaft of the engine within one of a sequence of speed prediction periods when speed of the engine is decreasing after fuel stops being burned in the engine, each of the speed prediction periods being set within an interval between start of decreasing of the speed of the engine and a complete stop of the engine;
a second calculator which works to calculate, in a manner different from the first calculator, a predicted value of the speed of the engine during reverse rotation of the output shaft of the engine within one of the speed prediction periods; and
switching means for switching between the first calculator and the second calculator to select one of the first and second calculators which is to be used in calculating the predicted value of the speed of the engine depending upon whether the predicted value is during the forward rotation or during the reverse rotation of the output shaft of the engine, the first calculator being selected when the predicted value is during the forward rotation of the output shaft of the engine, the second calculator being selected when the predicted value is during the reverse rotation of the output shaft of the engine.

2. An engine speed predicting system as set forth in claim 1, wherein the second calculator calculates the predicted value of the speed of the engine based on a fact that a friction loss that is a component of a loss of energy in the engine arising from mechanical friction in the engine, as created by stroke of a piston of the engine, acts on the output shaft of the engine in opposite directions at the same angular position of the output shaft between the forward rotation and the reverse rotation of the output shaft of the engine.

3. An engine speed predicting system as set forth in claim 1, wherein the first calculator defines each cycle of a change in speed of the engine arising from a periodic change in volume of a combustion chamber of the engine as one of engine rotation pulsating periods each of which is one of the speed prediction periods and predict a value of the speed of the engine in a first period that of one of the engine rotation pulsating periods based on a loss energy that is a loss of energy in the engine, as created in a second period that is one of the engine rotation pulsating periods which precedes the first period, and wherein the second calculator reverses a sign of a friction component included in a loss energy that is a loss of energy in the engine in one of the engine rotation pulsating periods during the forward rotation of the output shaft of the engine, the friction component resulting from mechanical friction in the engine, as created by stroke of a piston of the engine, and being contained in the loss energy along with a compression component resulting from a change in volume of the combustion chamber of the engine, the second calculator then determining the predicted value of the speed of the engine in a following one of the engine rotation pulsating periods during the reverse rotation of the output shaft of the engine based on the sum of the friction component whose sign is reversed and the compression component whose sign remains unchanged.

4. An engine speed predicting system as set forth in claim 2, wherein the second calculator sets a first prediction point at which the predicted value of the speed of the engine is to be calculated immediately after the rotation of the output shaft of the engine is changed from a forward direction to a reverse direction to an angular position of the output shaft of the engine which is returned from a zero-arrival position that is an angular position of the output shaft when the speed of the output shaft has reached zero by an angle through which the output shaft has rotated from a prediction point at which the speed of the output shaft has been predicted last before reversal of the rotation of the output shaft to the zero-arrival position.

5. An engine speed predicting system as set forth in claim 1, wherein the second calculator determines one of the angular position of the output shaft of the engine at a given time set before start of the reverser rotation of the output shaft and a parameter correlating with the angular position of the output shaft at the given time based on the predicted value of the speed of the output shaft during the forward rotation of the output shaft, as calculated by the first calculator, the second calculator calculating the predicted value of the speed of the output shaft during the reverse rotation of the output shaft based on the one of the angular position and the parameter.

6. An engine speed predicting system as set forth in claim 1, further comprising a controller which serves as an automatic engine stop/restart system to stop the engine when a given automatic engine stop condition is met and restart the engine through a starter when a given automatic engine restart condition is encountered after stop of the engine, wherein the starter includes an electric motor which rotates a pinion and an actuator which moves the pinion into engagement with a ring gear coupled to the output shaft of the engine, and wherein the controller determines a time when the pinion of the starter is to start to travel based on the predicted value of the speed of the output shaft of the engine, as calculated by either of the first and second calculators.

7. An engine speed predicting system as set forth in claim 6, wherein the controller sets a pinion travel inhibition period in which the pinion is inhibited from traveling toward the ring gear based on the predicted value of the speed of the engine, and wherein when the given automatic engine restart condition is satisfied within the pinion travel inhibition period, the controller starts to move the pinion through the starter after expiry of the pinion travel inhibition period.

8. An engine speed predicting system as set forth in claim 6, wherein the controller determines whether a reversal peak value in a first cycle of the reverse rotation of the output shaft while the speed of the engine is decreasing is greater than a given value of not, the reversal peak value being a peak of the speed of the output shaft of the engine within a period of time in which the output shaft has rotated by a reverse rotation amount after the rotation of the output shaft is changed in the reverse direction during decreasing of the speed of the engine, the reverse rotation amount being an amount by which the output shaft of the engine rotates in the reverse direction within an interval from start of reversal of rotation of the output shaft until the rotation of the output shaft is returned to the forward direction, and wherein the controller permits the pinion to engage the ring gear during the reverse rotation of the output shaft when the reversal peak value is determined to be smaller than or equal to the given value and inhibits the pinion from engaging the ring gear during the reverse rotation of the output shaft when the reversal peak value is determined to be greater than the given value.

* * * * *